United States Patent
Harden et al.

(10) Patent No.: US 10,735,823 B2
(45) Date of Patent: Aug. 4, 2020

(54) SYSTEM AND METHOD FOR OPTIMIZED DELIVERY OF LIVE ABR MEDIA

(71) Applicant: TELEFONAKTIEBOLAGET L M ERICSSON (PUBL), Stockholm (SE)

(72) Inventors: Benjamin Harden, Frisco, TX (US); Nicolas Pintaux, Boulogne-Billancourt (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/657,702

(22) Filed: Mar. 13, 2015

(65) Prior Publication Data

US 2016/0269801 A1 Sep. 15, 2016

(51) Int. Cl.
| | |
|---|---|
| *H04N 7/173* | (2011.01) |
| *H04N 21/6373* | (2011.01) |
| *H04N 21/647* | (2011.01) |
| *H04N 21/6405* | (2011.01) |
| *H04N 21/2187* | (2011.01) |
| *H04N 21/845* | (2011.01) |

(Continued)

(52) U.S. Cl.
CPC ..... *H04N 21/6373* (2013.01); *H04L 65/4076* (2013.01); *H04L 65/607* (2013.01); *H04N 21/2187* (2013.01); *H04N 21/4384* (2013.01); *H04N 21/6405* (2013.01); *H04N 21/6408* (2013.01); *H04N 21/64769* (2013.01); *H04N 21/8456* (2013.01); *H04L 65/605* (2013.01)

(58) Field of Classification Search
None
See application file for complete search history.

(56) References Cited

U.S. PATENT DOCUMENTS

| | | |
|---|---|---|
| 8,683,013 B2 | 3/2014 | Major et al. |
| 2004/0226044 A1 | 11/2004 | Goode |

(Continued)

FOREIGN PATENT DOCUMENTS

| | | |
|---|---|---|
| CN | 102740159 A | 10/2012 |
| CN | 103583040 A | 2/2014 |

(Continued)

OTHER PUBLICATIONS

Ericsson: "TV and Media 2014—Changing consumer needs are creating a new media landscape". Ericsson Consumer Insight Summary Report. Sep. 2014. http://www.ericsson.com/res/docs/2014/consumerlab/tv-media-2014-ericsson-consumerlab.pdf.

(Continued)

*Primary Examiner* — Nasser M Goodarzi
*Assistant Examiner* — Terrika Peterson
(74) *Attorney, Agent, or Firm* — Sage Patent Group

(57) ABSTRACT

A method and device for providing live adaptive bitrate (ABR) video to a client device using a multicast-to-unicast-ABR proxy is disclosed. The method includes responsive to the client device tuning to a channel or requesting a change in profile for the channel, requesting from a distribution server a burst of video fragments for the channel using a selected profile, the burst of video fragments to be delivered via unicast; responsive to the burst being completed, requesting to join a multicast for the channel, the multicast using the selected profile; and providing video for the channel to the client device via unicast using the selected profile.

14 Claims, 16 Drawing Sheets

(51) Int. Cl.
*H04L 29/06* (2006.01)
*H04N 21/6408* (2011.01)
*H04N 21/438* (2011.01)

(56) References Cited

U.S. PATENT DOCUMENTS

| | | |
|---|---|---|
| 2005/0265316 A1 | 12/2005 | Liu et al. |
| 2006/0020995 A1* | 1/2006 | Opie ............... H04N 21/23424 725/117 |
| 2006/0026302 A1* | 2/2006 | Bennett ............ H04L 29/06027 709/246 |
| 2006/0126667 A1* | 6/2006 | Smith ............... H04N 7/17318 370/486 |
| 2009/0106792 A1 | 4/2009 | Kan et al. |
| 2009/0116481 A1* | 5/2009 | Ishii ................. H04N 7/17318 370/390 |
| 2010/0254462 A1* | 10/2010 | Friedrich ......... H04N 21/26616 375/240.25 |
| 2010/0293587 A1* | 11/2010 | Haimi-Cohen ...... H04L 12/185 725/120 |
| 2011/0032832 A1* | 2/2011 | Jalali ................ H04L 47/10 370/252 |
| 2011/0188439 A1* | 8/2011 | Mao .................. H04N 7/17318 370/312 |
| 2011/0302604 A1 | 12/2011 | Halen et al. |
| 2012/0117214 A1* | 5/2012 | Mengle ................ G06F 9/5055 709/223 |
| 2012/0117256 A1* | 5/2012 | Waheed ................ H04L 12/18 709/228 |
| 2012/0144445 A1* | 6/2012 | Bonta ................ H04L 12/1868 725/116 |
| 2012/0304236 A1* | 11/2012 | Qiu ................... H04N 21/4384 725/109 |
| 2013/0179590 A1* | 7/2013 | McCarthy .......... H04N 21/8456 709/231 |
| 2013/0246578 A1* | 9/2013 | Moreman .......... H04L 67/2842 709/219 |
| 2014/0026052 A1* | 1/2014 | Thorwirth ................ G06F 3/01 715/721 |
| 2014/0169171 A1 | 6/2014 | Acker et al. |
| 2014/0229529 A1 | 8/2014 | Barone et al. |
| 2014/0280781 A1 | 9/2014 | Gregotski |
| 2014/0281007 A1 | 9/2014 | Lemmons et al. |
| 2014/0351383 A1 | 11/2014 | Wan et al. |
| 2014/0351638 A1 | 11/2014 | Chang |
| 2015/0101003 A1* | 4/2015 | Bull ................. H04N 21/64761 725/116 |
| 2015/0172775 A1* | 6/2015 | Yee ...................... H04N 21/485 725/37 |
| 2015/0288617 A1 | 10/2015 | Dasher et al. |
| 2015/0288730 A1 | 10/2015 | Friedrich et al. |
| 2015/0288732 A1* | 10/2015 | Phillips ................. H04L 65/60 709/219 |
| 2015/0365458 A1 | 12/2015 | Yamagishi |
| 2016/0036886 A1 | 2/2016 | Ito |
| 2016/0044078 A1 | 2/2016 | Hosur |
| 2016/0164992 A1* | 6/2016 | Prasad ............... H04L 67/2814 709/217 |
| 2016/0173922 A1 | 6/2016 | Clancy |
| 2016/0182671 A1 | 6/2016 | Dakhane et al. |
| 2016/0182966 A1 | 6/2016 | Hao et al. |
| 2016/0219023 A1 | 7/2016 | So |
| 2016/0269459 A1* | 9/2016 | Harden ................. H04L 65/602 |
| 2016/0269801 A1 | 9/2016 | Harden et al. |
| 2017/0127147 A1 | 5/2017 | Crabtree et al. |

FOREIGN PATENT DOCUMENTS

| | | |
|---|---|---|
| CN | 103650451 A | 3/2014 |
| CN | 104053182 A | 9/2014 |
| EP | 2 369 840 A1 | 9/2011 |
| EP | 2615842 A1 | 7/2013 |
| EP | 2665261 A1 | 11/2013 |

OTHER PUBLICATIONS

"The State of the CDN Market: Video Pricing, Contract, Volume and Market Sizing Trends". May 12, 2014. http://www.streamingmedia.com/dansblog/2014CDNSummit-Rayburn.pdf.

Park, Seungchul: "Integrated Session Control for Peer-to-Peer IPTV Services". International Conference on Convergence and Hybrid Information Technology. 2008.

Schulzrinne et al., "RTP: A Transport Protocol for Real-Time Applications," Network Working Group, Request for Comments: 3550, Obsoletes: 1889, Category: Standards Track, Jul. 2003, 104 pages.

Hoffman et al., "RTP Payload Format for MPEG1/MPEG2 Video," Network Working Group, Request for Comments: 2250, Obsoletes: 2038, Category: Standards Track, Jan. 1998, 17 pages. http://www.sanface.com/txt2pdf.html.

Chinese First Office Action dated Mar. 20, 2020 for Chinese Patent Application No. 201680015548.0, 13 pages total.

\* cited by examiner

SYSTEM AND METHOD FOR OPTIMIZED DELIVERY OF LIVE ABR MEDIA

FIELD OF THE DISCLOSURE

The present disclosure generally relates to providing live video in a more efficient manner to an adaptive bitrate (ABR) client that is receiving the video at a premises on a managed network. More particularly, and not by way of any limitation, the present disclosure is directed to a method and device for providing ABR video using a multicast mechanism for delivery to the premises.

BACKGROUND

Today, IP based live video content is delivered via two separate mechanisms, depending on the type of device and the type of network that needs to be leveraged:
   Multicast video delivery is typically used on "managed" networks, i.e. networks managed by telecom operators. On these networks, operators can guarantee a specific quality of service (QoS) and therefore can deliver video content at fixed bitrates with little packet loss and strong error recovery. Typical end devices are set-top-boxes (STBs) and residential gateways (RGs), but may also include content distribution network servers,
   Unicast adaptive bitrate (ABR) video delivery is typically used on "unmanaged" networks, e.g. on the open Internet and/or leveraging a content delivery network (CDN). Typically, there is little QoS on these unmanaged networks and the available bandwidth "end to end" will vary. ABR technology allows a client to switch to a lower bitrate instance of the same content when network conditions deteriorate. Target devices include personal computers (PCs), mobile phones, tablets, smart TVs, etc. These are also known as "reach" devices or reach clients. Most of these devices do not have multicast capabilities and can operate within or outside the household. When used in-home, reach devices do still request live content from the CDN, but the content is delivered over the managed network.

Some of the problems with the current state of the art include the following:
   As the content is being packaged differently for managed and unmanaged live video delivery, i.e., multicast for managed network vs unicast delivery over HTTP for ABR video delivery, it is cumbersome to build consumption synergies across devices, such as streaming from a STB to a tablet, or simply frame accurate bookmarking;
   Due to resource limitations of QoS queues in the access networks, unicast video content is prioritized as "regular internet data" and receives best effort delivery, rather than being treated as "video" as for the STB. QoS can therefore not be enforced as for the multicast video delivery. This translates into sub-optimal video bitrate selection for ABR and therefore a degraded user experience;
   Channel surfing can be cumbersome as the latency to obtain the content from the CDN exceeds the user expectation in terms of system responsiveness; and
   Policy enforcement on the access network is missing. There is currently no mechanism in the home network to anticipate upstream resource constraints on the fixed QoS access network based on downstream requests, and no mechanism to enforce policy on unmanaged reach clients in the home network.

SUMMARY

The present patent disclosure is broadly directed to devices and methods for facilitating a scheme for providing live ABR content in a more efficient manner to reach devices that are operating in a home or other premises that subscribes to a managed network. The proposed solution is based on the following main architectural concepts:
   A unified and optimized ABR video delivery chain is based on the multicast encapsulation of unicast content already prepared for ABR delivery. Content is delivered over the managed network via multicast instead of unicast and is prioritized as "video" rather than data, without needing additional QoS queues;
   A aggregated delivery of HLS, MPEG-DASH, and ABR manifests, allowing the STB or the RG to have prior knowledge of all manifests for all ABR streams corresponding to the same channel. HLS and MPEG-DASH fragments share the characteristics of being transport stream-based, which allows the reconciliation of stream delivery across QoS and unmanaged networks;
   A ABR multicast receiver functionality implemented on the residential gateway, set-top-box, or CDN to serve content to "reach" devices located on the in-home network. The RG or STB serves as a proxy to the other devices on the in-home network by converting the optimal multicast to the required unicast. Bitrate of the multicast is adapted by switching from one multicast group address to another through continuous monitoring, but only after passing all constrained network segments. The proxy looks like a regular ABR content server to the reach devices and no specialized applications or added hardware are required to play the content delivered over the multicast network. In addition, this process allows unified consumption across STB and reach devices and enables frame accurate bookmarking. For example, a user can pause on the STB and resume on a tablet reach device;
   An accelerated channel change and error recovery functionality for ABR streams. Known systems address constant or fixed bit rate streams, but do not address accelerated channel change for ABR;
   An adaptive bit rate functionality for multicast streams that allows the ABR device to switch between stream profiles while using multicast, as is currently available in traditional unicast. This hybrid system supplements multicast with small amounts of unicast to improve responsiveness while drastically reducing the need for unicast for ABR.
   A new bi-directional multicast adaptive bit rate (MABR) stream policy enforcement protocol used to determine the upstream optimal multicast group to join, and used downstream to manipulate unicast ABR clients to conform to the MABR policy enforcement.

In one aspect, an embodiment of a method for providing live adaptive bitrate (ABR) video to a client device using a multicast-to-unicast-ABR proxy is disclosed. The method comprises responsive to the client device tuning to a channel or requesting a change in profile for the channel, requesting from a distribution server a burst of video fragments for the channel using a selected profile, the burst of video fragments to be delivered via unicast; responsive to the burst being completed, requesting to join a multicast for the channel, the multicast using the selected profile; and providing video for the channel to the client device via unicast using the selected profile.

In another aspect, an embodiment of a method of enforcing bandwidth policy on a client device that is consuming ABR video provided via a multicast-to-ABR proxy (M2AP) is disclosed. The method comprises responsive to detecting network congestion, leaving an existing multicast stream for a first profile of a channel, joining a selected multicast stream for a second profile of the channel that is selected with regard to the detected network congestion, and requesting from a distribution server a burst of video fragments for the channel using the second profile; restricting a channel profile that is delivered to the client device, the channel profile listing the first profile for received fragments that use the first profile and listing the second profile for new fragments; and after delivering received video that uses the first profile, delivering video to the client using the second profile.

In another aspect, an embodiment of a multicast-to-unicast adaptive bitrate (ABR) proxy (M2AP) is disclosed. The M2AP comprises an ABR manager that is configured, responsive to a client device tuning to a channel or requesting a change in profile for the channel, to request from a distribution server a first burst of video fragments for the requested channel using a first profile, the first burst of video fragments to be delivered via unicast; a multicast receiver that is configured, responsive to the first burst being completed, to request to join a first multicast for the channel, the first multicast using the first profile; and an output interface that is configured to provide video for the requested channel to the client device via unicast using the first profile.

Advantages of the present invention include, but are not limited to the following:

Reach clients that are operating within premises that subscribe to a managed network can consume content delivered via multicast network through the access network to the premises. The reach device does not need the ability to join multicast streams directly. Wasteful unicast bandwidth costs for live content are reduced. With the content delivered over the managed network, QoS can be applied to the content, so that the quality of content on the reach device depends on the quality and capacity available on the in-home network rather than the capabilities on the home internet subscription line.

By aggregating all the profile manifests in one structure delivered over all multicast streams carrying the profiles, the STB and RG are provided with a complete view on all available profiles and fragments for a given channel. This can be leveraged to speed up the channel change functionality and to apply customized policies around stream management.

Hardware based encoder/transcoders are not needed in the home network, reducing costs for STB or RG-related hardware. For reach client players, specialized applications are not needed, as the proxy handles the conversion transparently. In addition, bookmarking live streams is accurately aligned to the same point in time. Since the STB and reach devices can consume content that is packaged together and aligned by group of pictures (GOP), a bookmark set from a tablet would apply to the corresponding stream for the STB at the same point in time.

The accelerated channel change infrastructure will enable a better user experience when switching channels, and will provide error recovery. Previously, the instant channel change mechanism has not been applied to unicast ABR.

The new fast bit rate change mechanism for multicast will facilitate rapid response times for multicast bitrate changes in case the available bandwidth on the access network or home network drops. There is currently no mechanism to adapt to congestion by switching multicast group addresses. Switching will not cause an interruption to the video, although the user may perceive some changes in video quality when a change of profile becomes effective.

A congestion policy is enabled to enforce change at the reach client in response to congestion. Existing art is unicast based, while reach clients have no visibility into upstream resources. The reach client believes it is in control, while the true control is moved to the M2AP, such as a STB, RG, or CDN.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
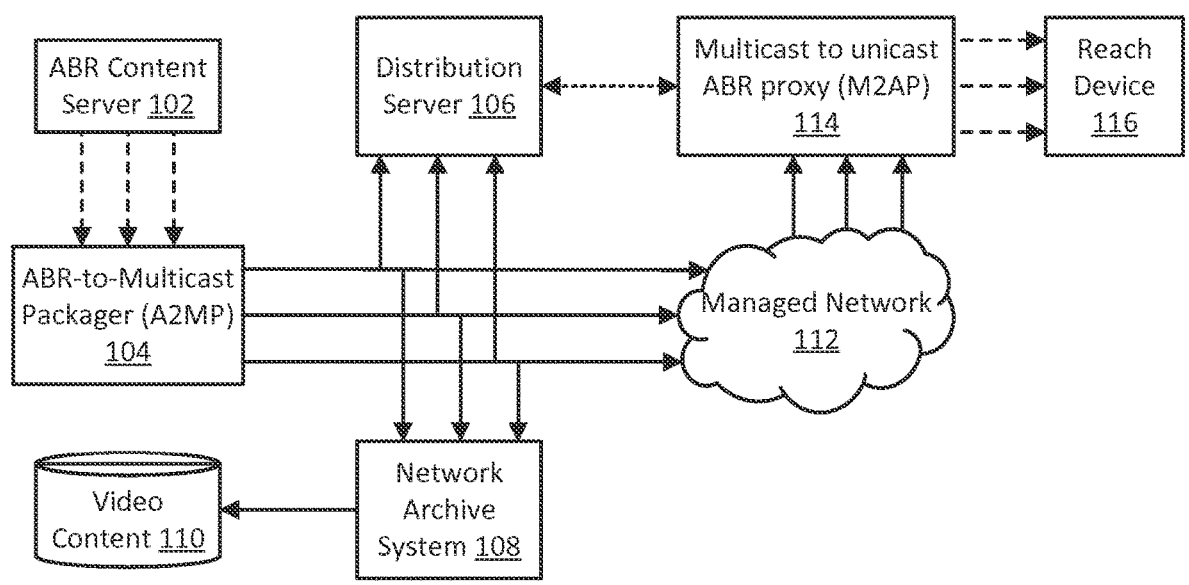
FIG. 1 depicts a high-level view of a system for the optimized delivery of live ABR media according to an embodiment of the present patent application.

In the following description, numerous specific details are set forth with respect to one or more embodiments of the present patent disclosure. However, it should be understood that one or more embodiments may be practiced without such specific details. In other instances, well-known subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, a system 100 for optimized delivery of live ABR media is shown. The system includes five nodes: ABR-to-multicast packager (A2MP) 104, distribution server 106, multicast-to-unicast ABR proxy (M2AP) 114, network archive system 108 and reach device 116. ABR content server 102 provides content to system 100. The function of the five nodes is described below.

A2MP 104 is responsible for puffing live ABR transport-stream-based content from an HTTP content server, such as ABR content server 102, and multicasting each stream on a separate multicast address by wrapping transport steams in User Datagram Protocol/Transmission Control Protocol (UDP/RTP) as defined by RFC-2250. This mechanism provides for dock recovery and datagram loss retry. Additionally, A2MP 104 aggregates each profile manifest where necessary, stores the manifests in MPEG-2 Private Sections, which are packetized into Transport Stream packets and wrapped into RTP packets. A2MP 104 then multiplexes the manifest-containing RTP packets with the RTP packets containing content for delivery in a multicast stream. Finally, this node will provide error recovery by retransmitting lost RTP datagrams via unicast for single loss events and multicast retransmission for correlated loss.

Multicast to unicast ABR proxy (M2AP) 114 is a node located either in network datacenters, where this node can provide service to end-user households, or in the end-user household. When located in the end-user household, M2AP 114 can be a set-top box, residential gateway, or any device playing the role of a central delivery node within the household; otherwise M2AP 114 can be upstream in the network. M2AP 114 can tune to multicast streams available on the managed network, request missing packets or data bursts from distribution servers 106 as unicast, and serve as a local HTTP server to deliver unicast content to reach devices located on the in-home network. In a practical implementation, it is likely that not all profiles and/or all services will have a multicast version of the ABR content requested. If the M2AP does not have a requested profile, it can send a 302 redirect to upstream CDN for the client to retrieve the ABR profile manifest and content via HTTP unicast, thus bypassing the M2AP for fragment requests. M2AP 114 is responsible for keeping the ABR content manifest up-to-date and having fragments available for the reach device(s) when needed. Some M2APs, such as set-top boxes, are also used as primary playback and recording devices. Residential gateways can also be used as recording devices.

Distribution server 106 is responsible for buffering the output of A2MP 104 and serving the buffered packets to M2AP 114 upon request, as will be explained in greater detail. M2AP 114 can request missing datagrams from distribution server 106 or a burst of data to fill their internal buffer. Distribution server 106 can also request missing datagrams from the A2MP.

Reach devices 116 are nodes that can be located either within or outside the end-user household; they implement a bandwidth stream management system. When located outside the home network, they detect in real time the lack of local HTTP servers, such as M2AP 114, and request content from the CDN via unicast ABR directly over the open Internet. When located inside the household, they participate in bandwidth stream management and, based on resource constraints, they may request content via unicast ABR from M2AP 114, which in turn makes the content available locally over HTTP(s). When local resources are constrained, the bandwidth stream management system converges in real time and the request will bypass the local resources and request the content via unicast ABR from the CDN.

Network archive system 108 is one or more nodes that are deployed within the operator network, ideally as close as possible to the end subscribers. The archive system is configured to join multicast streams available on the managed network, request missing datagrams from the A2MP, reconstruct the ABR fragments and store them for later access by the subscribers as regular non-live ABR content over HTTP. Network archive system 108 applies the same ABR fragment reconstruction process as M2AP 114.

Figure 2A:
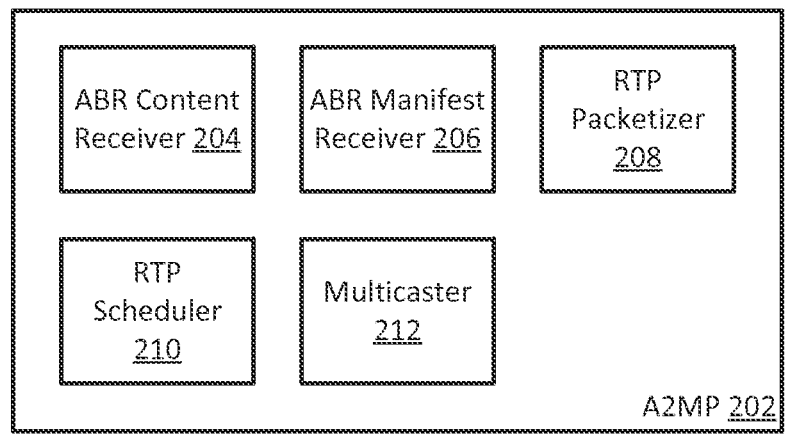
FIG. 2A depicts a functional block diagram of an ABR-to-multicast packager (A2MP) according to an embodiment of the present patent application.
Figure 2B:
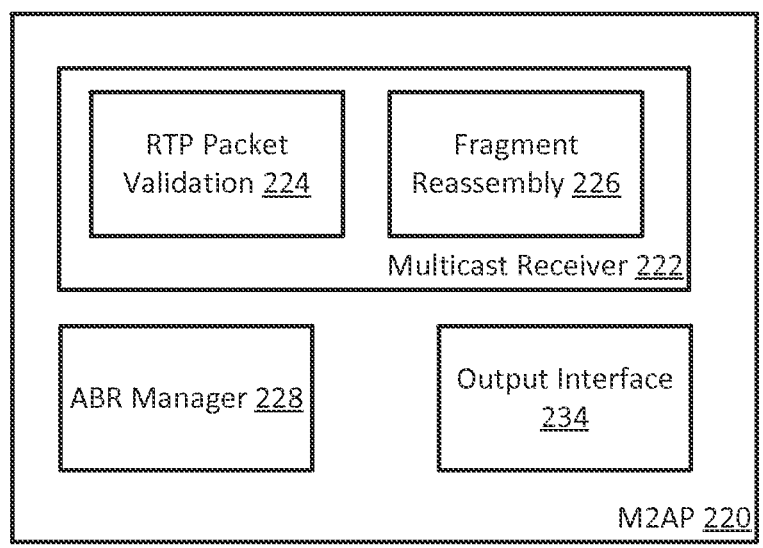
FIG. 2B depicts a functional block diagram of a multicast-to-ABR proxy (M2AP) according to an embodiment of the present patent application.
Figure 2C:
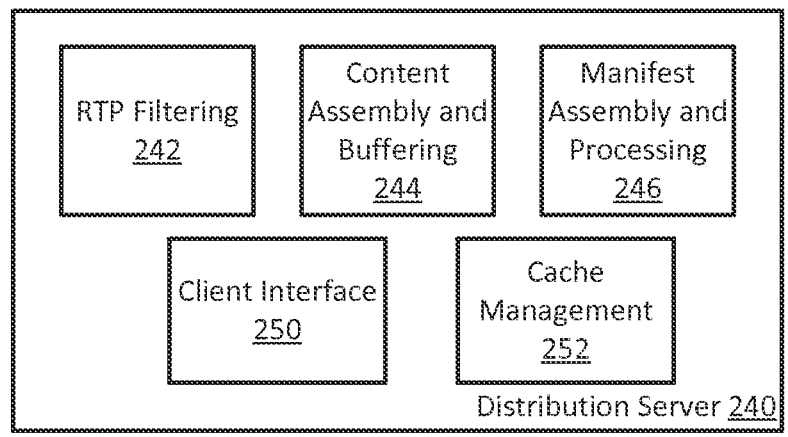
FIG. 2C depicts functional block diagram of a distribution server (D-server) according to an embodiment of the present patent application.
Figure 2D:
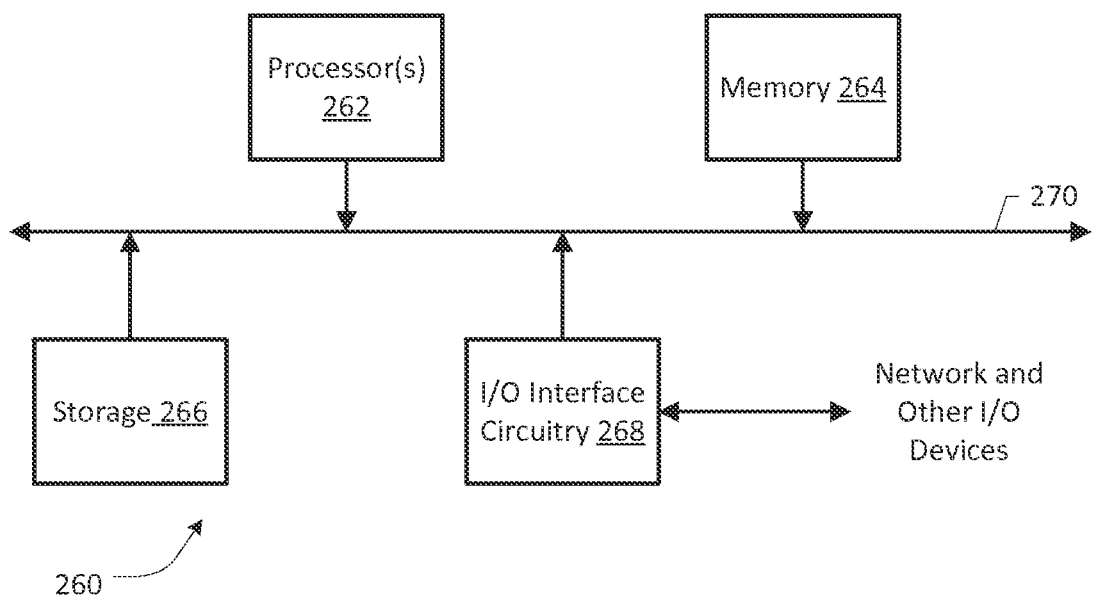
FIG. 2D depicts a block diagram of the essential hardware for any of FIGS. 2A-2C according to an embodiment of the present patent application.

Three of the devices of FIG. 1 are shown in functional block diagrams in FIGS. 2A-2C and their essential hardware elements are shown in FIG. 2D. ABR-to-multicast packager (A2MP) 202, which is an embodiment of A2MP 104, comprises ABR content receiver 204 and ABR manifest receiver 206, which together request and receive the manifest and fragments that make up the content of the live video, RTP packetizer 208 and RTP scheduler 210, which prepare the outgoing RTP packets and schedule their output, and multicaster 212. The functions of these components will be discussed in greater detail with reference to the flowchart of FIGS. 3A and 3B.

Multicast-to-ABR proxy (M2AP) 220, which is an embodiment of M2AP 114, comprises multicast receiver 222, which is itself comprised of RTP packet validation module 224 and fragment reassembly module 226. M2AP 220 further comprises ABR Manager 228 and output interface 234. ABR Manager 228 is responsible for stitching together the ABR content received via both multicast and requested bursts from Distribution Server 106 and making this ABR content available via the Output Interface 234. The function of these components of M2AP 220 will be discussed in greater detail in relationship to FIGS. 4A-4E and FIGS. 8A-13.

Distribution server 240, which is an embodiment of distribution server 106, comprises RTP filtering module 242, content assembly and buffering 244, manifest assembly and processing 246, cache management 252 and client interface 250. The function of the components of distribution server 240 will be discussed in greater detail with regard to FIG. 5, as well as FIGS. 8A-13.

FIG. 2D is a generalized block diagram of the hardware organization of a network node such as A2MP 202, M2AP 220 and distribution server 240 shown in FIGS. 2A, 2B, 2C. Node 260 includes one or more processors 262, memory 264, local storage 266 and input/output (I/O) interface circuitry 268 coupled together by one or more data buses 270. The I/O interface circuitry 268 couples the device to one or more external networks, additional storage devices or systems, and other input/output devices as generally known in the art. System-level functionality of the device as described herein is provided by the hardware executing computer program instructions, typically stored in the memory 264 and retrieved and executed by the processor(s) 262.

Figure 3A:
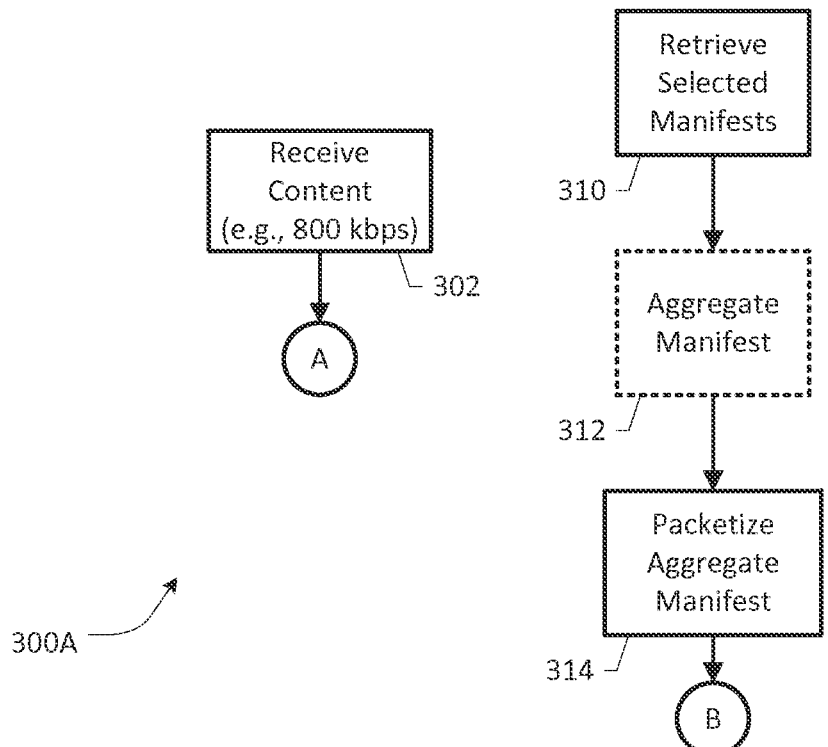
FIGS. 3A and 3B depict flowcharts of a process that can be practiced by the A2MP of FIG. 2A according to an embodiment of the present patent application.
Figure 3B:
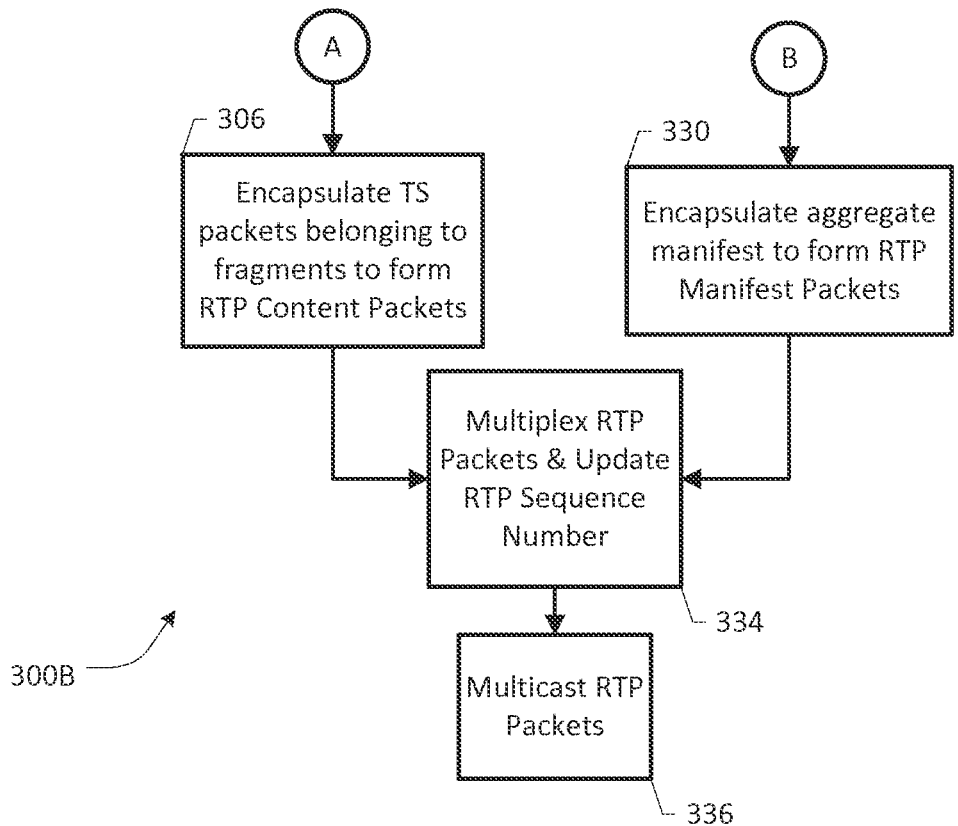
Figure 4A:
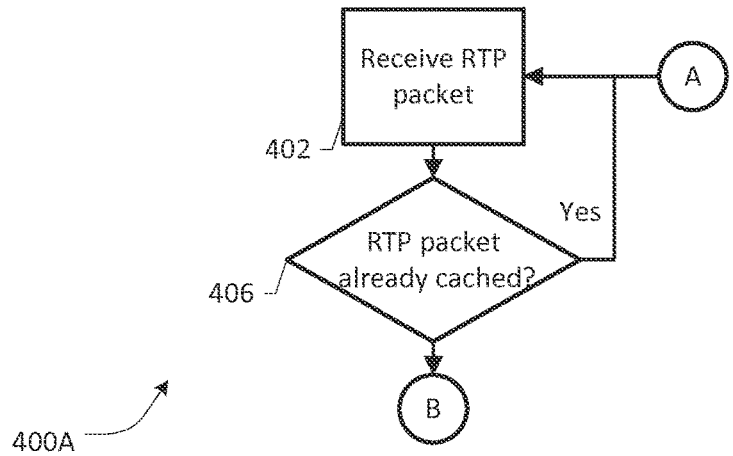
FIGS. 4A-4E depict flowcharts of a process that can be practiced by the M2AP of FIG. 2B according to an embodiment of the present patent application.
Figure 4B:
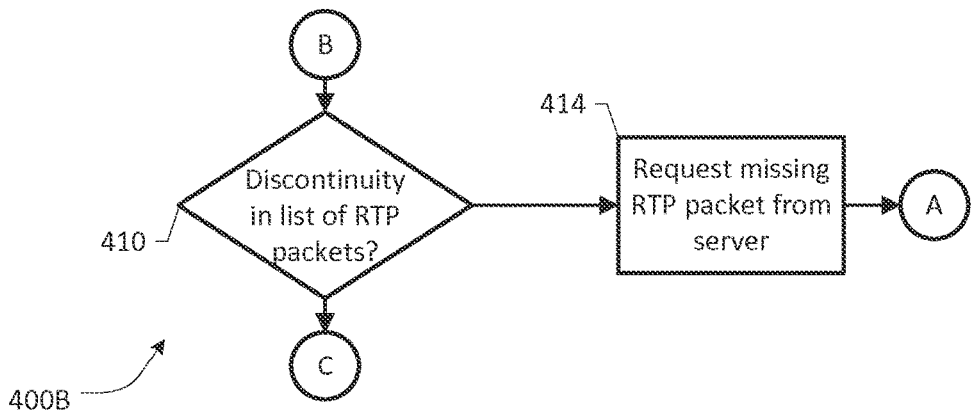
Figure 4C:
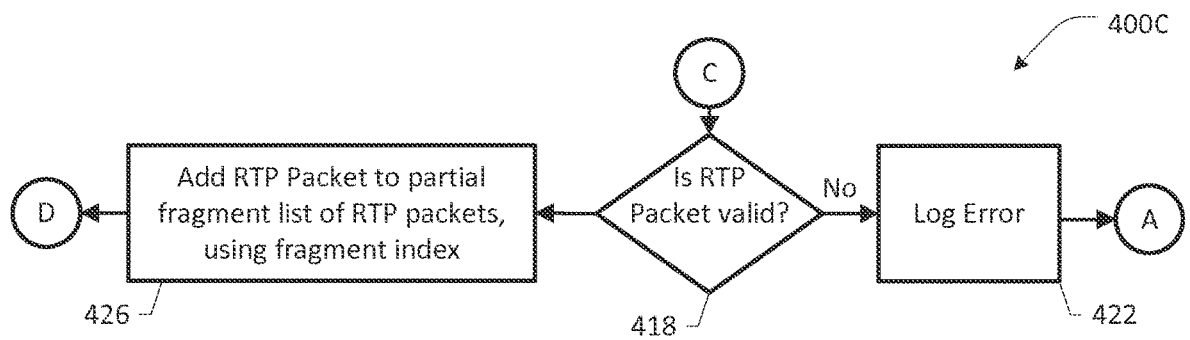
Figure 4D:
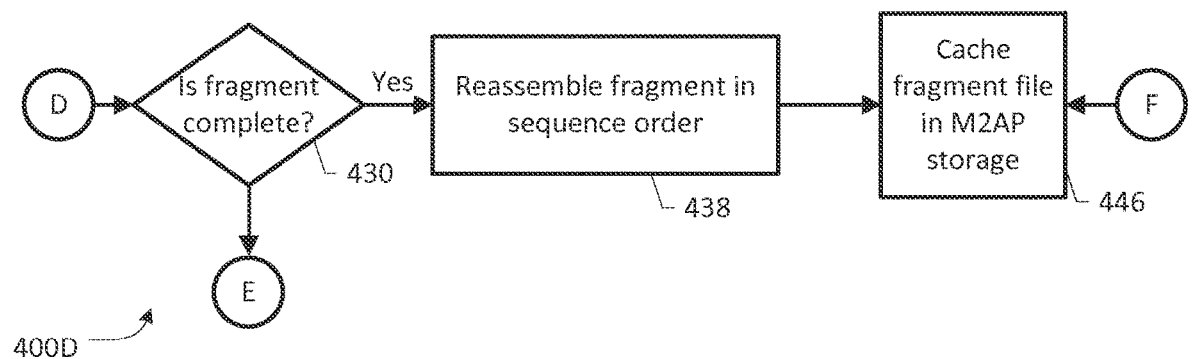
Figure 4E:
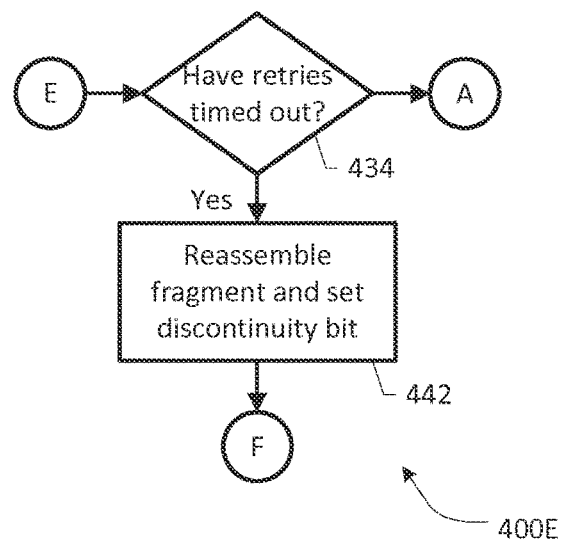

The disclosed process will now be described with reference to the remaining figures. FIGS. 3A-3B illustrate the process of converting a live ABR stream into a multicast RTP stream. In general, ABR-to-multicast packager (A2MP) 202 is configured to retrieve the channel manifest for a particular channel. The channel manifest lists the profile manifests that correspond to each profile composing the channel, i.e., the various bitrates at which the user device can receive the channel. A2MP 202 can filter the channel manifest to consider only a subset of all profiles made available by the live ABR content server. For a given channel, A2MP 202 transmits one multicast for each selected profile; each of these multicasts carries with it an aggregate manifest that contains those profiles that are available via multicast.

For each considered profile, ABR manifest receiver 206 retrieves the profile manifest (310). Each profile manifest can have its own validity period, and ABR manifest receiver 206 is responsible for retrieving the new version of each profile manifest on a regular basis. ABR manifest receiver 206 then optionally aggregates all the selected profile manifests (312) in a single private data structure, called an aggregate manifest, which can be implementation-dependent. This element is optional, since in the case of MPEG-DASH formatted content, channel and profile manifests are included in the media presentation description (MPD), which is already an aggregate manifest. In this case, ABR manifest receiver 206 only needs to retrieve this MPD on a periodic basis, and does not need to retrieve the channel manifest and all profile manifests separately. If, however, A2MP 202 is not multicasting all of the available profiles, the MPEG-DASH MPD should be filtered to remove those profiles that are not provided. RTP packetizer 208 stores the aggregate manifest (314) in MPEG-2 Private Sections using a private dedicated Packet Identifier (a.k.a. "PID"), which is also implementation-dependent. The resulting MPEG-2 Private Sections are packetized in Transport Stream packets, which are themselves encapsulated into RTP packets (330), with a RTP Header extension identifying an aggregate manifest, and are made available to RTP scheduler 210.

In parallel, for each profile, ABR content receiver 204 requests and receives (302) the latest fragment listed in the profile manifest. At any point in time, A2MP 202 transmits only the latest fragments available for each profile. Each fragment is composed of transport stream packets, which RTP packetizer 208 encapsulates (306) into a sequence of RTP packets, each having an RTP Header extension identifying a fragment. Each of the RTP packets contains 7 MPEG-2 transport stream packets, except for the last RTP packet, which will contain a number of packets dependent on the fragment size, i.e. (fragment_size/(188*7))/188 transport packets. Those packets are then made available to RTP scheduler 210.

In at least one embodiment, rather than re-multiplexing the transport packets composing the fragments with the transport packets carrying the aggregate manifest, RTP scheduler 210 re-multiplexes each data set at the RTP layer, i.e., after encapsulation. This enables downstream components to filter each data set at the RTP layer, rather than at the transport stream layer. One skilled in the art will recognize that it would also be possible to re-multiplex at the transport stream level. The following therefore summarizes the re-multiplexing process at the RTP layer. RTP packet multicast scheduler 210 reads the RTP packets encapsulating the fragment every fragment period and reads the RTP packets encapsulating the aggregate manifest with a period not exceeding one second. RTP scheduler 210 schedules the transmission of RTP packets coming from both sources, i.e., fragments and aggregate manifests, and updates the RTP sequence numbers for each RTP packet (334). Multicaster 212 transmits (336) the resulting sequence of RTP packets over multicast. The bitrate of a given multicast will therefore be greater or equal to the aggregate bitrate of the fragment, alter accounting for RTP encapsulation, plus the bitrate resulting from the periodic insertion of the aggregate manifest. It should be noted that the A2MP transmits an aggregate manifest, in which each profile manifest lists fragments which are no longer transmitted. This information will be used by the distribution server, as well as the M2AP, to enable specific scenarios such as packet retries and time-shifting.

In order for distribution server 106, network archive system 108, and M2AP 114 to reconstruct the ABR fragments, it is necessary to identify in which order the packets are transmitted and need to be buffered, as well as which packets carry fragment payload or MPEG-2 Private Sections containing the aggregate manifest. For that reason, different RTP header extensions are used for RTP packets carrying fragment payload and for those RTP packets carrying the aggregate manifest. The RTP fixed header already provides a sequence number, which is used to re-order RTP packets received over multicast and to request them if missing. To further identify where a fragment starts and ends, the system uses a private "fragment" RTP Header Extension, whose syntax can be the following:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         fragment_type          |          length = 12          |
+-+-+-+-+-+-+-+-+-+-+-+-+-+-+-+-+-+-+-+-+-+-+-+-+-+-+-+-+-+-+-+-+
|                           fragment_id                          |
+-+-+-+-+-+-+-+-+-+-+-+-+-+-+-+-+-+-+-+-+-+-+-+-+-+-+-+-+-+-+-+-+
|                          fragment_size                         |
+-+-+-+-+-+-+-+-+-+-+-+-+-+-+-+-+-+-+-+-+-+-+-+-+-+-+-+-+-+-+-+-+
|         fragment_RTP_packet_index         |    RTP_TS_pkts    |
+-+-+-+-+-+-+-+-+-+-+-+-+-+-+-+-+-+-+-+-+-+-+-+-+-+-+-+-+-+-+-+-+
``` where
fragment_type (16-bit) is an arbitrary value to signal that the RTP packet contains fragment-related data; a proposed value is 0xABCD;
fragment_id (32-bit) is a unique identifier for the fragment being transmitted over multicast RTP;
fragment_size (32-bit integer, unsigned) is the total size of the fragment, with the total number of RTP packets derived from this number as fragment_size/(188*7)+1; fragment_size must be a multiple of 188 bytes and must the same for all RTP packets with the same fragment_id;
fragment_RTP_packet_index (24-bit integer, unsigned) is an index of the RTP packet in the sequence of RTP packets making the full fragment; the value must be strictly smaller than (fragment_size/188*7+1); and
RTP_TS_pkts (8-bit integer, unsigned) is the number of transport packets encapsulated within the RTP packet and must be equal to 7, except for last RTP packet of the sequence.

Similarly, it is necessary to identify if the RTP packet carries an aggregate manifest. The following "manifest" RTP Header extension can be used to signal an aggregate manifest file.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         manifest_type          |          length = 8           |
+-+-+-+-+-+-+-+-+-+-+-+-+-+-+-+-+-+-+-+-+-+-+-+-+-+-+-+-+-+-+-+-+
|  man_version  |                 manifest_size                  |
+-+-+-+-+-+-+-+-+-+-+-+-+-+-+-+-+-+-+-+-+-+-+-+-+-+-+-+-+-+-+-+-+
|         manifest_RTP_packet_index         |    RTP_TS_pkts    |
+-+-+-+-+-+-+-+-+-+-+-+-+-+-+-+-+-+-+-+-+-+-+-+-+-+-+-+-+-+-+-+-+
``` where
manifest_type (16-bit) is an arbitrary value to signal that the RTP packet contains manifest-related data; a proposed value is 0x1234;
man_version (8-bit, unsigned) is a manifest version, maintained by the A2MP and updated when the aggregate manifest is updated; this value is incremented by 1 with every new version and rolls over to 0 when it reaches 0xFF;
manifest_size (24-bit, unsigned) is the total size of the aggregate manifest encapsulated in MPEG-2 Private Sections; the total number of RTP packets is derived from the number, manifest_size/(188*7)+1; this value must be a multiple of 188 bytes, and must be the same for all RTP packets with the same man_version;
manifest_RTP_packet_index (24-bit integer, unsigned) is an index of the RTP packet in the sequence of RTP packets making the full aggregate manifest; the value must be strictly smaller than (manifest_size/188*7+1);
RTP_TS_pkts (8-bit integer, unsigned) is the number of transport packets encapsulated within the RTP packet and must be equal to 7, except for last RTP packet of the sequence.

FIGS. 4A-4E describe how both M2AP 220 and network archive system 108 re-assemble fragments based on the RTP packets received over multicast. The specific case of ABR file fragments is considered here, but the re-assembly of MPEG-2 sections encapsulating the aggregate manifest follows the same process, the only difference being in the RTP header extension type being checked. Similarly, the process is described in terms of M2AP 220, but one skilled in the art will recognize that the description also applies to archive system 108. Initially, multicast receiver 222 receives an RTP packet on a specific multicast address corresponding to a predefined profile (402). Multicast receiver 222 may receive duplicates of any RTP packet, e.g. after re-transmission by the A2MP. RTP packet validation 224 therefore checks (406) whether the RTP packet has already been received and processed, i.e. cached. If this is the case, multicast receiver 222 resumes listening for new multicast packets. Based on the RTP fixed header sequence number, RTP packet validation 224 also checks (410) if there is a discontinuity in the sequence of RTP packets, as packets are not guaranteed to arrive in order. It should be noted that RTP packets may contain fragment payload or MPEG-2 Private Sections encapsulating the aggregate manifest. At this stage, RTP packet validation 224 only checks the RTP fixed header and its sequence number, and does not check the nature of the RTP payload. If a sequence discontinuity is detected, RTP packet validation 224 requests (414) the missing RTP packet from distribution server 106. Notably, distribution server 106 and network archive system 108 also have the ability to request missing packets and will make their requests to A2MP 104. RTP packet validation 224 also checks for any inconsistency within the RTP header extension that would render the RTP pack invalid (418). For a given fragment_id, the following conditions must be met:

fragment_size remains the same across all RTP packets;
fragment_RTP_packet_index must be smaller than fragment_size/(188*7); and
RTP_TS_pkts must be equal to 7, except for the last RTP packet.

If any inconsistency is detected, RTP packet validation 224 logs an error (422), which will point to a packaging issue to be fixed. If the RTP packet is valid, the packet is added (426) to a list of RTP packets, identified by fragment_id, and indexed with fragment_RTP_packet_index.

For each RTP packet received, multicast receiver 222 checks whether the corresponding list is complete (430). If the list of RTP packets for a given fragment_id is complete, packet reassembly 226 re-assembles (438) the fragment by de-packetizing the transport streams from the RTP packets in sequence order. Multicast receiver 222 then caches (446) the re-assembled fragment. This fragment then becomes available for local playback or HTTP retrieval. If the list of RTP packets for a given fragment_id is incomplete, then multicast receiver 222 checks if all missing packets have been retried and if all requests have timed out (434). If this is not the case, some packets are still to be received, and the node returns in listening mode. If, however, all missing packets retries have timed out, then the list is considered pseudo-complete, and fragment reassembly 226 re-assembles (442) the fragment by de-packetizing the valid RTP packets in sequence order, and by setting transport_discontinuity_bits appropriately in the MPEG-2 transport stream headers to signal a discontinuity. This information will be used by the reach client to reset its decoder during playback. Multicast receiver 222 then caches (446) the re-assembled fragment, which becomes available for local playback or HTTP retrieval.

Like M2AP 114 and network archive system 108, distribution server 106 is also a multicast client of the A2MP. However, distribution server 106 does not re-assemble fragments, but buffers RTP packets indexed by fragment_id, based on the profile manifest that it will extract from the aggregate manifest received in the same multicast stream. Due to network constraints, it may happen that distribution server 106 does not receive all RTP packets. In this case, the distribution server 106 will request packet retries from the A2MP. When issuing a burst, the distribution server 106 will send RTP packets in the same sequence order as originally sent by Multicaster 212.

Figure 5:
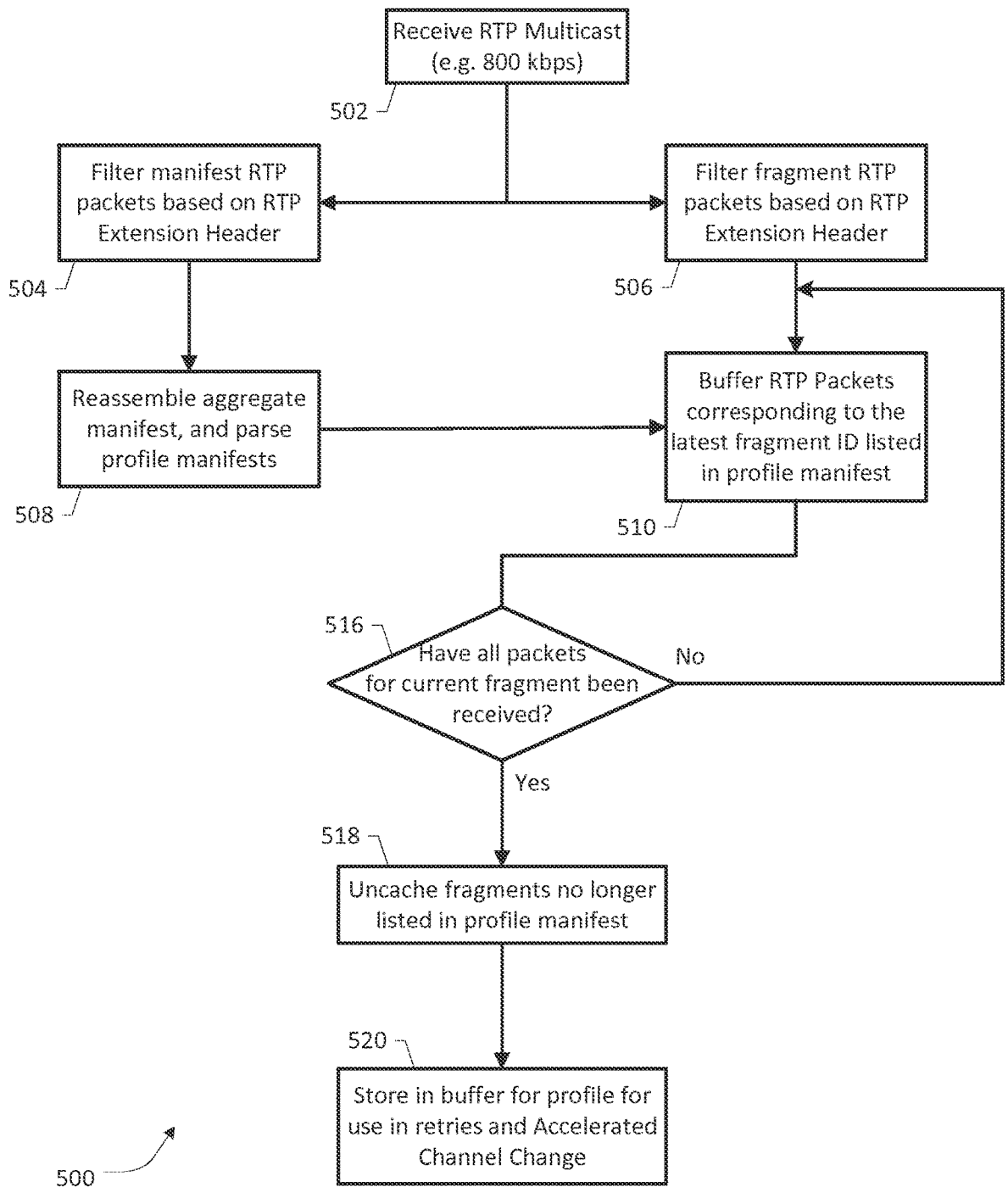
FIG. 5 depicts a flowchart of a method that can be practiced by a distribution server of FIG. 2C according to an embodiment of the present patent application.

FIG. 5 illustrates the buffering process of distribution server 240. After joining a multicast stream originating from A2MP 202, distribution server 240 receives the RTP multicast (502) for a selected bitrate, e.g. 800 kbps. RTP filtering module 242 of distribution server 240 filters out RTP packers that contain the "manifest" RTP Header extension (506). Manifest assembly and processing 246 then re-assembles the aggregate manifest (508), which is periodically sent by A2MP 202, and extracts from the aggregate manifest, the profile manifest corresponding to the stream received via on the multicast stream. In a parallel process, RTP filtering 242 filters out RTP packets that contain a "fragment" RTP header extension (506). Content assembly and buffering 244 uses the profile manifest, reassembled at 508, to filter and collect all RTP packets corresponding to the latest fragment for this profile (510). Once the latest fragment is reassembled, cache management 252 removes from the cache any fragments that are no longer listed in the current profile manifest (518). Cache management 252 then stores the latest RTP packets in its internal buffers for use in accelerated channel change and retries (522). Client interface 250 has not participated in the action described so far, but will interact with M2AP 220 in the process described in FIGS. 8-13.

Figure 6:
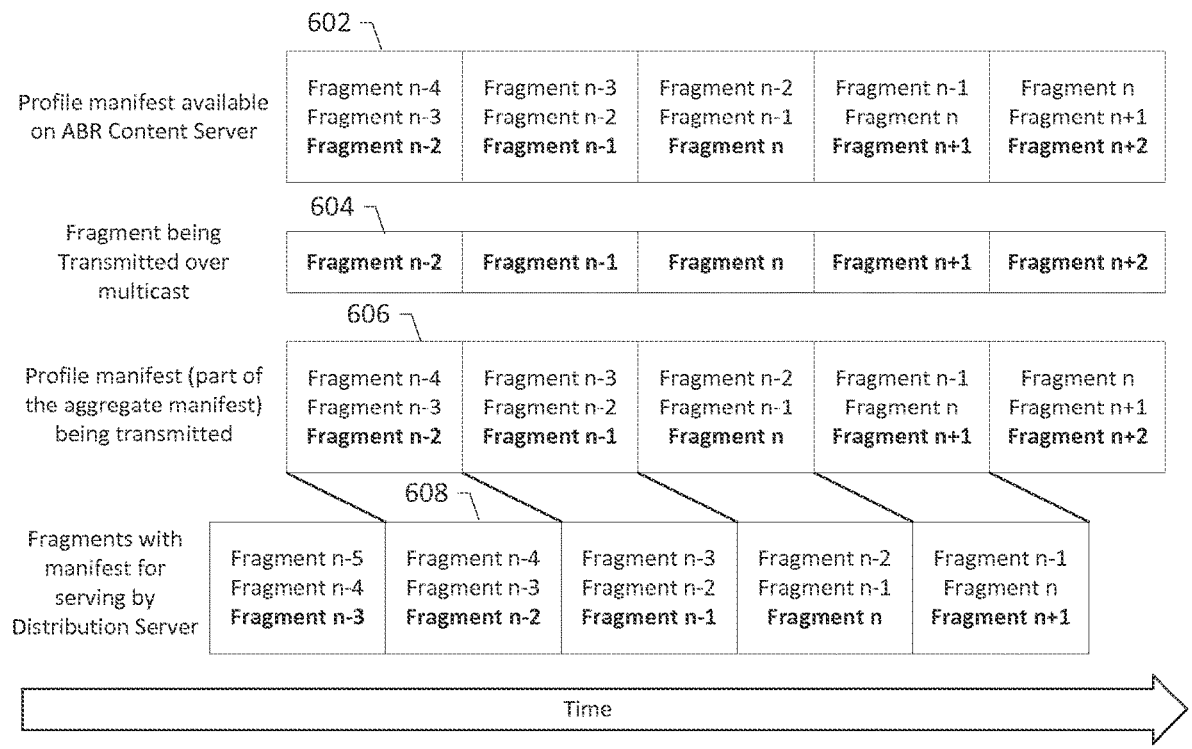
FIG. 6 illustrates the timing relationships between manifests exposed by the components of the system of FIG. 1 according to an embodiment of the present patent application.

FIG. 6 illustrates the timing relationships between the content 602 available on ABR content server 102, the fragment 604 being transmitted over multicast by A2MP 104, and the set of fragments 606 that distribution server 106 can serve during a burst. As can be seen, the profile manifest 602 available on ABR content server 102 and the profile manifest 606 being transmitted as part of the multicast stream are the same, i.e. Fragments n-4, n-3, n-2 in the first time slot illustrated, and are sent while Fragment n-2 604 is being transmitted over multicast. This same set of fragments will be served by distribution server 106 in a slightly delayed time frame 608. It should be noted that distribution server 106 can start a burst containing the latest fragment a bit before this fragment is actually completely received, knowing that it will have the complete fragment when needed. Similarly, the M2AP 114 can serve the latest aggregate manifest a bit before the last fragment is completed, as this fragment can be finalized while the distribution server is bursting its data.

Figure 7:
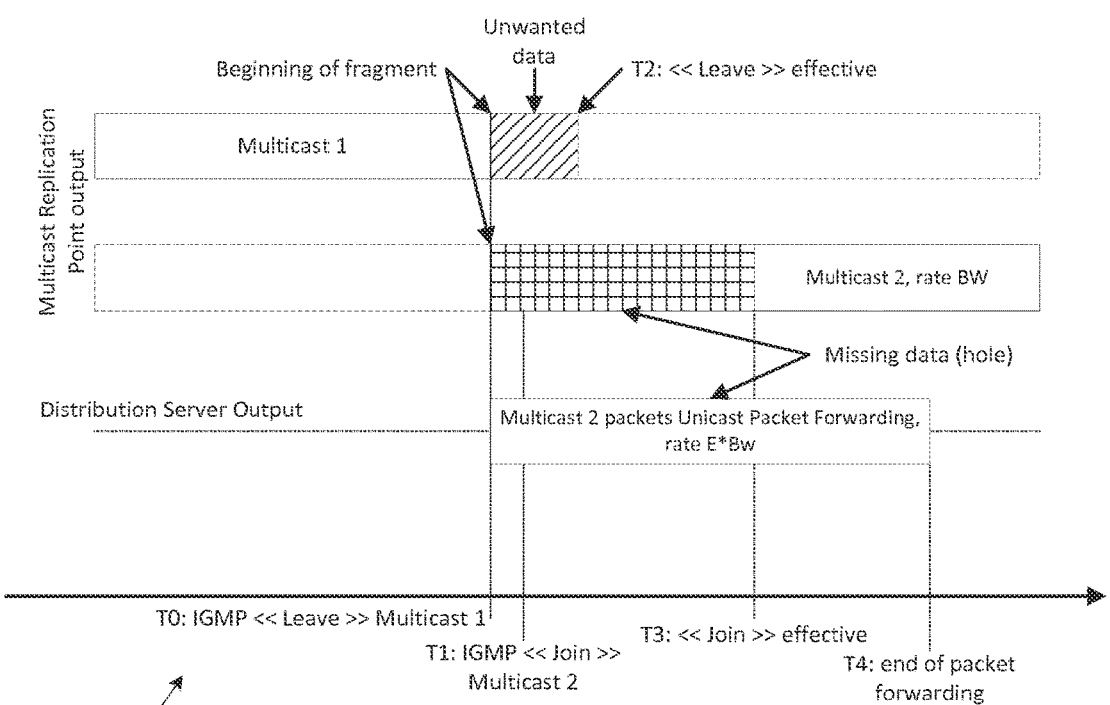
FIG. 7 illustrates a multicast tune on a fragment boundary and how the present system avoids data loss according to an embodiment of the present patent application.

Looking next at FIG. 7, it is notable that in a multicast ABR environment, multicast streams are aligned by group-of-pictures (GOP). When a reach client performs an Internet Group Management Protocol (IGMP) "Leave" from one multicast, e.g. multicast 1, the reach client can still receive some multicast packets for a period of time, e.g. 50 milliseconds. This is illustrated in the figure as unwanted data. Similarly, when performing an IGMP "Join" on a multicast, e.g., multicast 2, there can be a period of time during which the client will not receive any multicast packet, e.g. 100 milliseconds, illustrated with cross-hatching. In a multicast ABR environment, a client typically switches from one multicast stream to another on a fragment boundary. This translates into the illustrated data loss, which impairs the completeness of the first fragment received on the second multicast. The amount of data loss is equal to the difference in time between the leave (T0) and the join (T3) times the bitrate (Bw) of the multicast, i.e., (T3 −T0)*Bw. To circumvent this data loss, the present system relies on additional bandwidth allocated for packet retries, shown as the distribution server output. In the disclosed system, distribution server 106 acts as a packet forwarder over unicast, with a bandwidth equal to E*Bw, where E is some fraction of the bitrate that is already allocated for use in multicasting. By forwarding packets from the start of the fragment, this process ensures that the client has recovered a portion of the packets that would be missed during the IGMP latency without performing any retries.

Having looked at the components of the disclosed system, we will now turn to the methods used by these components to fill the missing data and provide optimized delivery of live ABR media, which are detailed in FIGS. 8-13. A delivery system outlined in this patent application sends content delivered over multicast to the STB or RG, which serves as an multicast-to-ABR proxy (M2AP) and delivers the content to reach clients on the premises using unicast. One skilled in the art will understand that the reach client can discover which channels are available via the M2AP. One of the major challenges to enable the reach Client to tune to a station quickly is to make the relevant fragments available on the M2AP as quickly as possible. This patent application proposes a combination of three mechanisms to speed up the tuning operation of the reach client:

- When the reach client issues a "tune" request to the M2AP, the M2AP replies with a channel manifest containing a single profile. Selection of the profile to be made available depends on operator choices and policies, as well as stream management conditions;
- Simultaneously, the M2AP requests a unicast data burst from the distribution server, so that the M2AP can start filling its internal buffer with the fragments and the aggregated manifest. The requested data burst contains fragments currently being transmitted or recently transmitted, i.e., 1-10 seconds in the past; the burst rate is dependent on available bandwidth but will typically be at a data rate of 120% to 400% greater than the nominal rate of video; and
- During the burst, the M2AP will periodically update the profile manifest served to the reach client with the list of fragments it has correctly re-assembled and cached. When the burst is over, the profile manifest served by the M2AP should be identical to the one contained within the aggregated manifest.
- Note that When the consumption device is a STB or other device that does not need ABR fragments, as is the case when the M2AP is a STB and consumption is requested on that STB, the ABR fragment reassembly can be skipped when appropriate, and transport stream packets can be fed directly to the decoder.

Figure 8A:
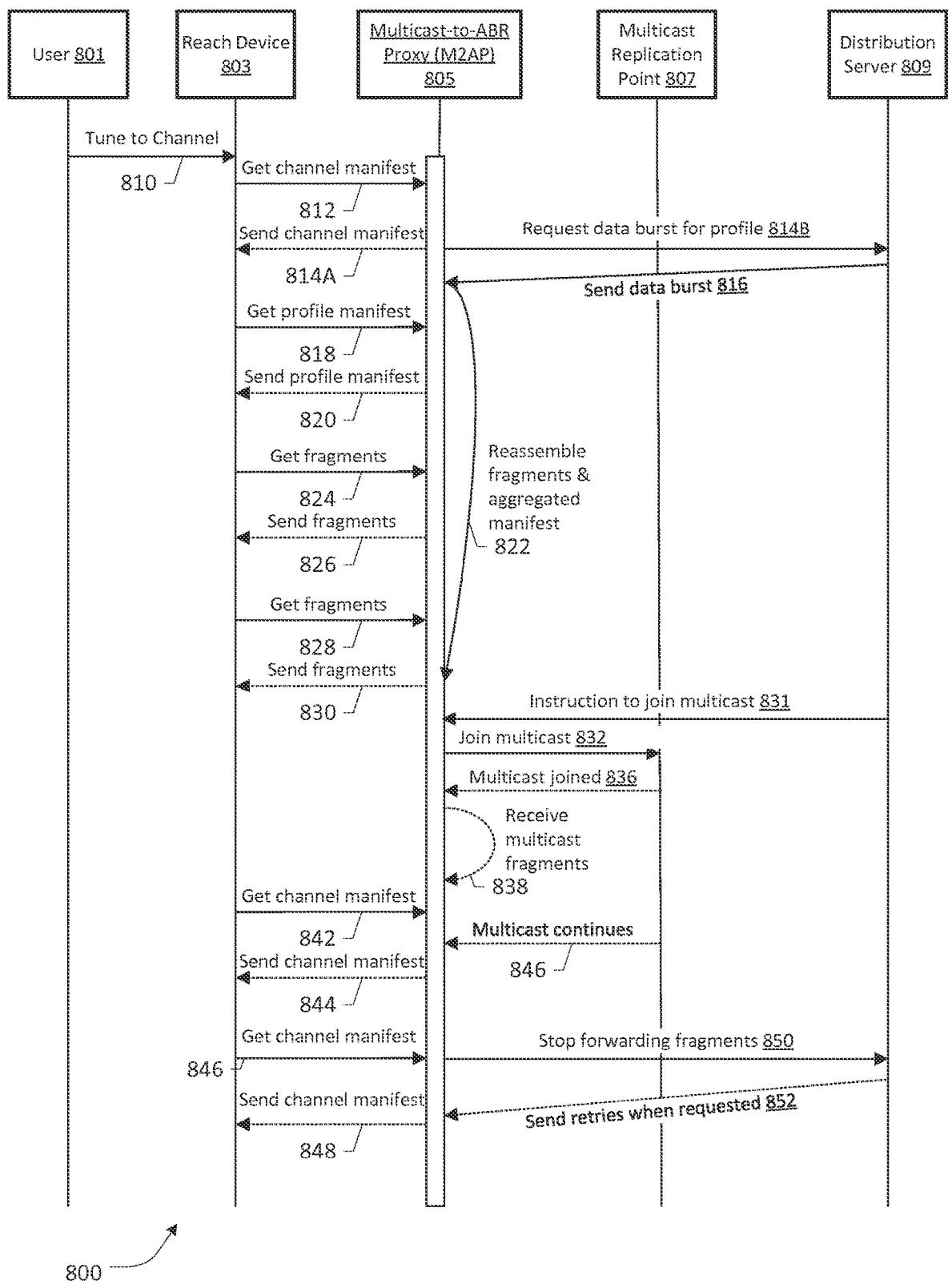
FIG. 8A depicts the process of tuning to a new channel on a reach device according to an embodiment of the present patent application.
Figure 9:
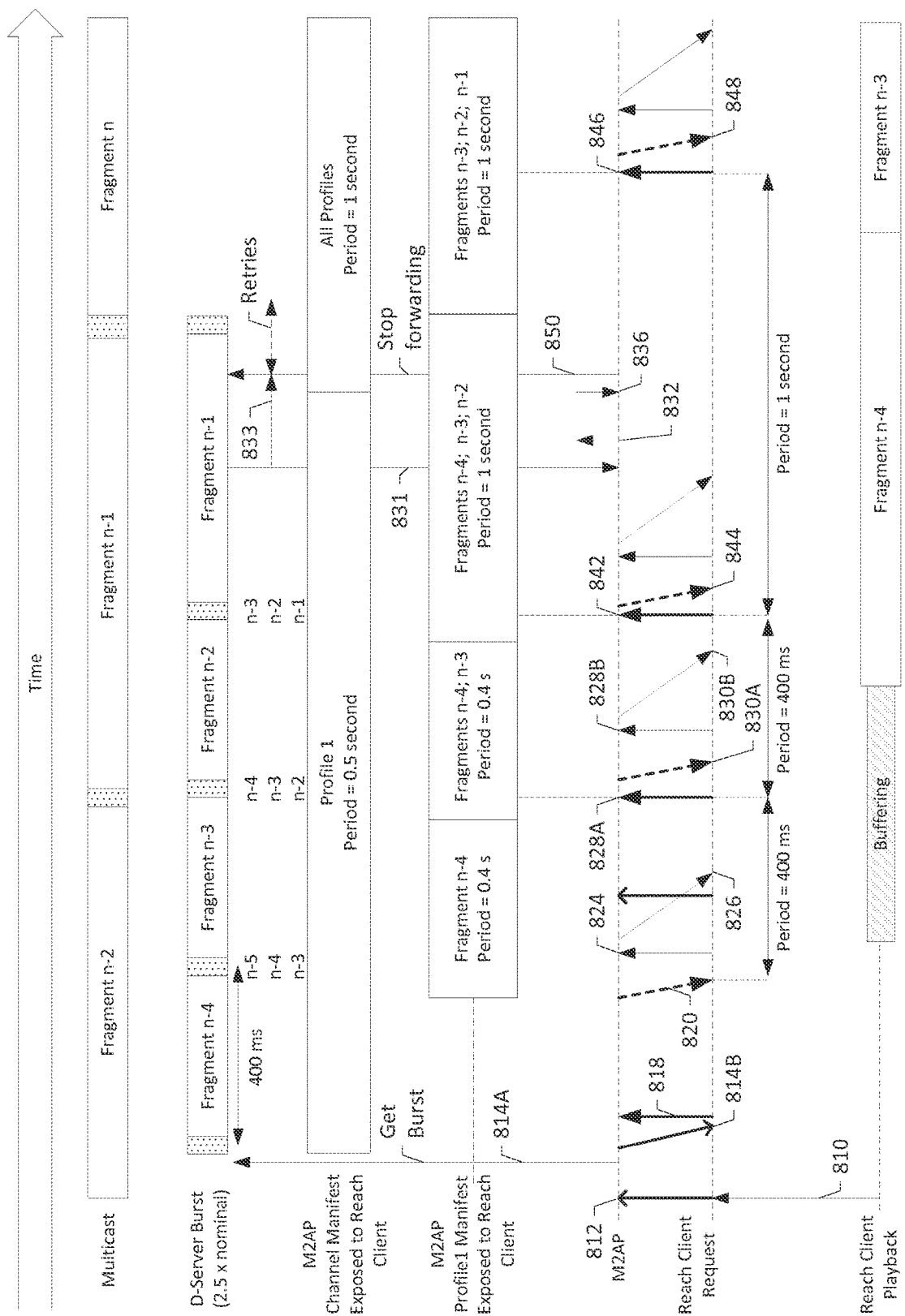
FIG. 9 depicts the timing of the process of FIG. 8A.

FIG. 8A describes in detail the process of tuning to a channel on a reach client, while FIG. 9 illustrates the same process from a timing perspective. The following reference numbers and their descriptions refer to both FIG. 8A and FIG. 9. It will be recognized that M2AP 805 corresponds to M2AP 220 of FIG. 2B and in at least one embodiment, contains the functional blocks shown in the earlier figure. The process begins with a user 801 selecting a channel to tune to (810) on the user interface of reach device 803. One skilled in the art will understand that reach device 803 will have been provisioned with a URL of the M2AP and will access this URL to obtain the manifest of the channel (812). To accelerate the tuning process, of reach client 803, M2AP 805 replies with a channel manifest (814A) that contains the selected single profile. At the same time, M2AP 805 requests a data burst corresponding to this profile (814B) from distribution server 809. Distribution server 809 sends the data burst (816), which contains the aggregate manifest and fragments corresponding to the profile currently in its buffers. The operator can configure the bitrate of this burst, as well as how many fragments it contains. Typically the bitrate will be set to match the minimum buffer requirements of the reach client to start playback. Note that in the example shown in FIG. 9, the operator has configured a 2.5× burst rate, and a 2-fragment buffer. It is also worthy of note that the channel manifest will be maintained and updated by M2AP 805. Reach client 803 will request this manifest periodically, just as the client would normally request the manifest when tuned to a regular over-the-top (OTT) ABR content server. By controlling the period of the manifest, it is possible for M2AP 805 to enforce stream management policies in almost real-time.

Based on the channel manifest served by M2AP 805, reach device 803 requests the profile manifest corresponding to the stream profile it expects (818). At the time of this request, the aggregate manifest as well as the first fragments should already be in flight towards M2AP 805 from distribution server 809. As soon as M2AP 805 has received the aggregate manifest and the first fragment, M2AP 805 generates a profile manifest with one fragment listed and sends the profile manifest (820) to reach client 803. The manifest is in a format supported by the reach client player which is, for example, HLS or MPEG-DASH. As seen in FIG. 9, M2AP 805 sets the period of this manifest to a value according to when it anticipates having a new fragment re-assembled from the burst, e.g. 0.4 second. By then, M2AP 805 will re-generate a new profile manifest with two fragments listed, and so on until it has all fragments listed in the aggregate manifest available. This process forces reach client 803 to re-fetch the profile manifest early enough to request the next fragment. When M2AP 805 anticipates that distribution server 809 is about to end its burst, it sets the period of the profile manifest to the maximum value, which is the duration of a fragment, e.g., 1 second. Throughout the data burst, M2AP 805 re-assembles fragments and the aggregated manifest (822) and reach device 803 starts requesting fragments (824) that are advertised as available on the M2AP. M2AP 805 replies with the corresponding fragment over HTTP (826). The sequence of requesting and sending fragments repeats (828, 830) as M2AP 805 serves fragments on request from reach device 803. During this time, the unicast burst originating from distribution server 809 is still active, and the channel manifest served by M2AP 805 is still limited to one profile, forcing the reach client heuristics to remain constrained to this single bit stream.

Once distribution server 809 has emptied its buffer, this server sends a message to M2AP 805 to join the multicast (831). Distribution server 809 then starts forwarding fragments (833) at a rate of E, where "E" is a configurable bandwidth percentage above the nominal rate of video that is allocated on the network, e.g., for retries when packets are lost or spare bandwidth when network is not busy. This scaling back of the unicast material prevents overflow on the pipe or network when the client starts receiving the multicast, while still ensuring that M2AP 805 can still receive fragments during the IGMP join latency. Ideally the hole resulting from the IGMP join delay will be filled by the time all RTP datagrams corresponding to the first multicast fragment are received. To ensure the hole can be filled by the "E" burst at or near the same time as the first multicast fragment is downloaded, E will be equal to or greater than the IGMP join latency (j) divided by the fragment duration (f). As noted earlier, any additional missing RTP datagrams can be retried through a specific request from M2AP 805 to distribution server 809, requesting the sequence needed to fill the hole. M2AP 805 joins the multicast corresponding to the profile currently decoded (832). This is issued as an IGMP join request to the nearest upstream multicast replication point 807. Meanwhile, the unicast burst continues at the rate of E. Once the join is effectuated (836), M2AP 805 starts receiving multicast packets at the nominal rate of audio/video. As detailed earlier, the multicast stream contains both the latest live fragments corresponding to the profile, packetized into RTP packets and an aggregate manifest encapsulated into MPEG-2 Private Sections and RTP packets.

At this point as seen in FIG. 9, M2AP 805 updates the channel manifest to list all profiles that it can make available for the channel, based on operator policies and stream management real-time constraints. M2AP 805 immediately instructs distribution server 809 to stop forwarding fragments (850), and will request any necessary retries. M2AP 805 updates its profile manifest and caches the latest fragment. When reach client 803 next requests the latest version of the channel manifest (846), M2AP 805 returns an updated channel manifest (848) to reach client 803. From that point on, reach client 803 is operable to re-calculate its heuristics as part of standard ABR algorithms and to determine if the current profile offers the best possible quality given the device capabilities and network conditions (not specifically shown). Occasionally, M2AP 805 may not receive all multicast packets, in which case M2AP 805 will request those from distribution server 809 in order to have all fragments available on time for reach client 803. Distribution server 809 returns missed RTP packets (852) to M2AP 805 from the distribution server's circular buffer. In the example of FIG. 9 the dotted boxes between fragments represent the updates of the aggregate manifests being delivered in the multicast stream and distribution server bursts. As mentioned earlier, the aggregate manifest is repeatedly transmitted during the fragment transmission lifetime, and gets updated at fragment boundary. In the example shown, one second fragments are used, with 2.5× factor for the burst, i.e., during a burst, a one-second fragment is transmitted in 400 ms by distribution server 809.

Figure 8B:
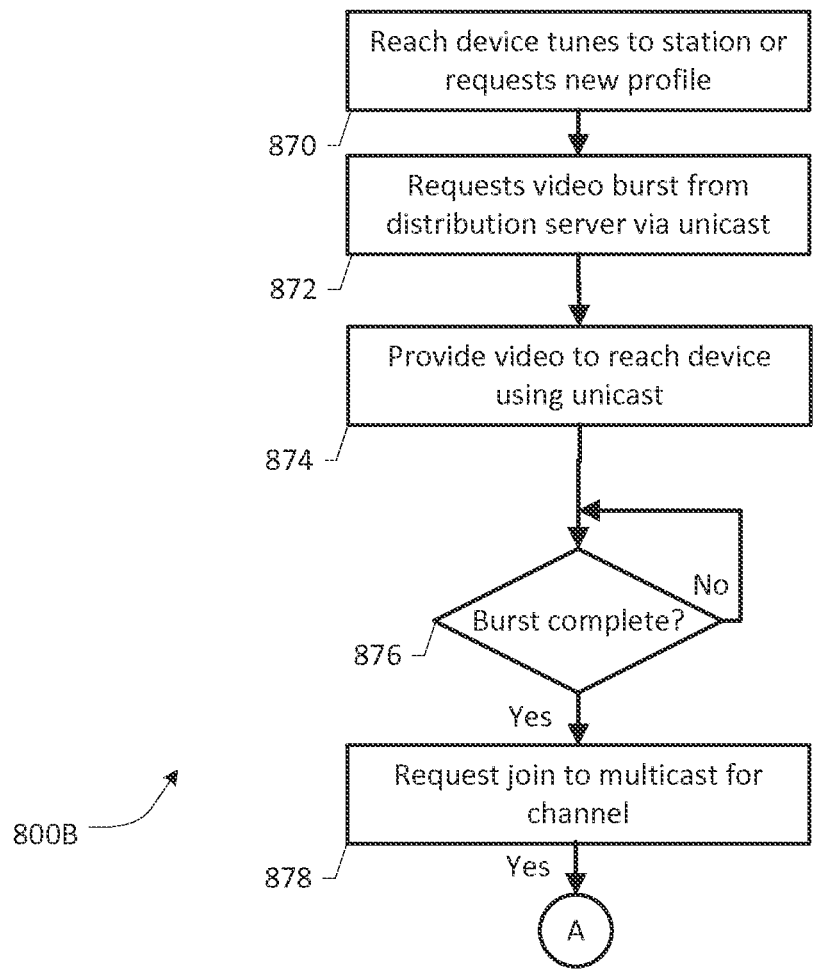
FIGS. 8B and 8C depict a simplified version of the process of FIGS. 8A and 10.
Figure 8C:
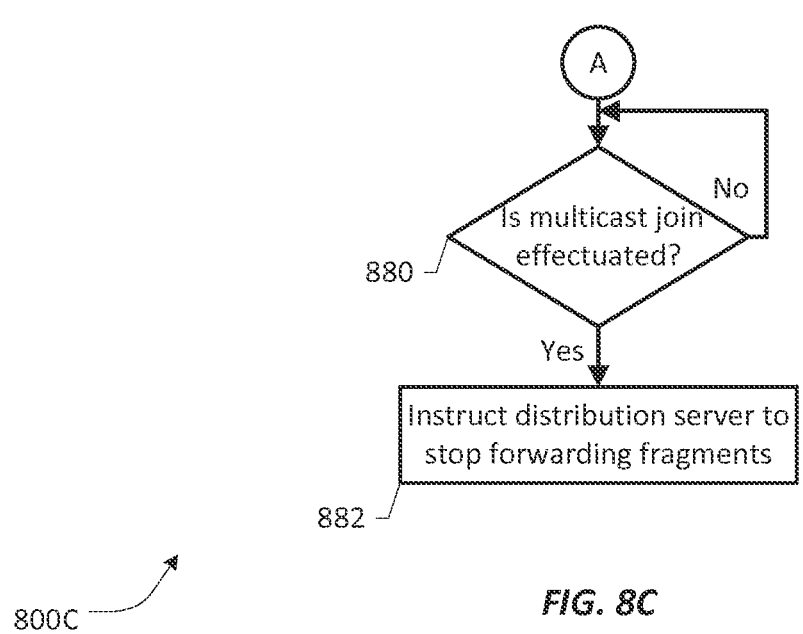

A situation similar to the tuning process described above occurs when reach device 803 switches from one profile to another, as will be described in FIGS. 10 and 11. Prior to looking at the details of a profile switch, FIGS. 8B and 8C illustrate the similarities between the tuning process of FIGS. 8A and 9 and the profile change process of FIGS. 10 and 11. In process 8008, reach device 803 can rune to a station or else request a new profile (870). In either case, ABR Manager 228 of M2AP 805 requests a video burst from distribution server 809 via unicast (872). Once the initial fragments are received, ABR Manager 228 begins providing the received video to output interface 234, which delivers the video to reach device 803 using unicast (874). M2AP 805 then determines whether the burst is complete (876). This determination can be provided by distribution server 809, which can instruct M2AP 805 to join the appropriate multicast. If the burst is complete, multicast receiver 222 sends a request to join the appropriate multicast for the selected channel (878). In process 800C, M2AP 805 determines whether the multicast join has been effectuated (880) and once the join is effectuated, instructs distribution server 809 to stop forwarding fragments (882). At this time, M2AP 805 can also resume requesting any necessary retries.

Looking at the next sets of figures, it can be noted that bandwidth policy can be enforced based on downstream conditions, i.e., on reach client heuristics or based on stream management policies defined by the operator and on the constraints of the managed network. FIG. 10 illustrates the disclosed process when reach device 803 switches from one profile to another based on its heuristics calculation, with FIG. 11 illustrating the same process from a timing perspective. FIG. 12 illustrates how M2AP 805 can force reach client 803 to switch profiles based on operational policies, stream management or network conditions and FIG. 13 illustrates the process of FIG. 12 from a timing perspective.

Figure 10:
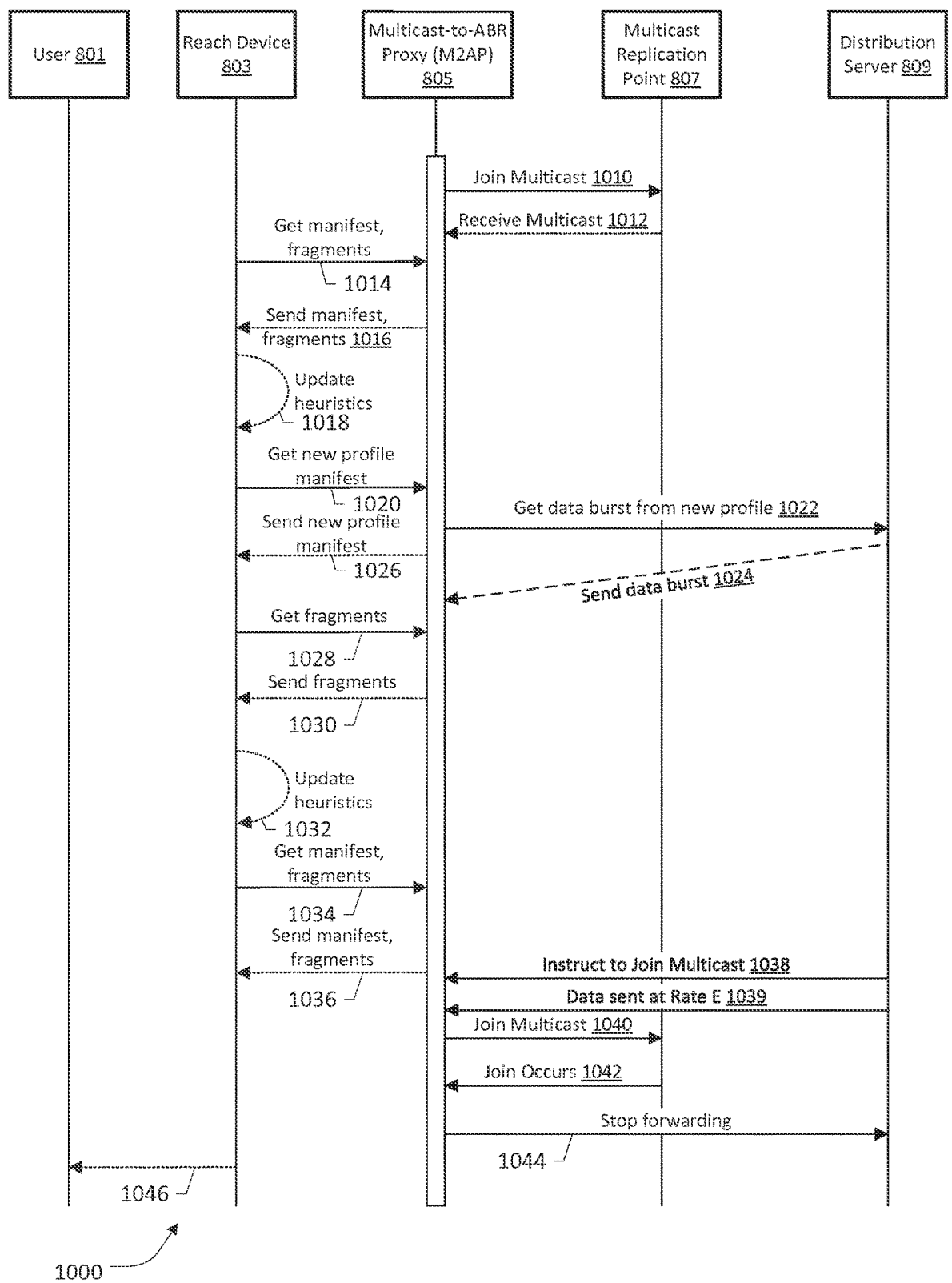
FIG. 10 depicts the process of switching to a new profile requested by a reach device according to an embodiment of the present patent application.
Figure 11:
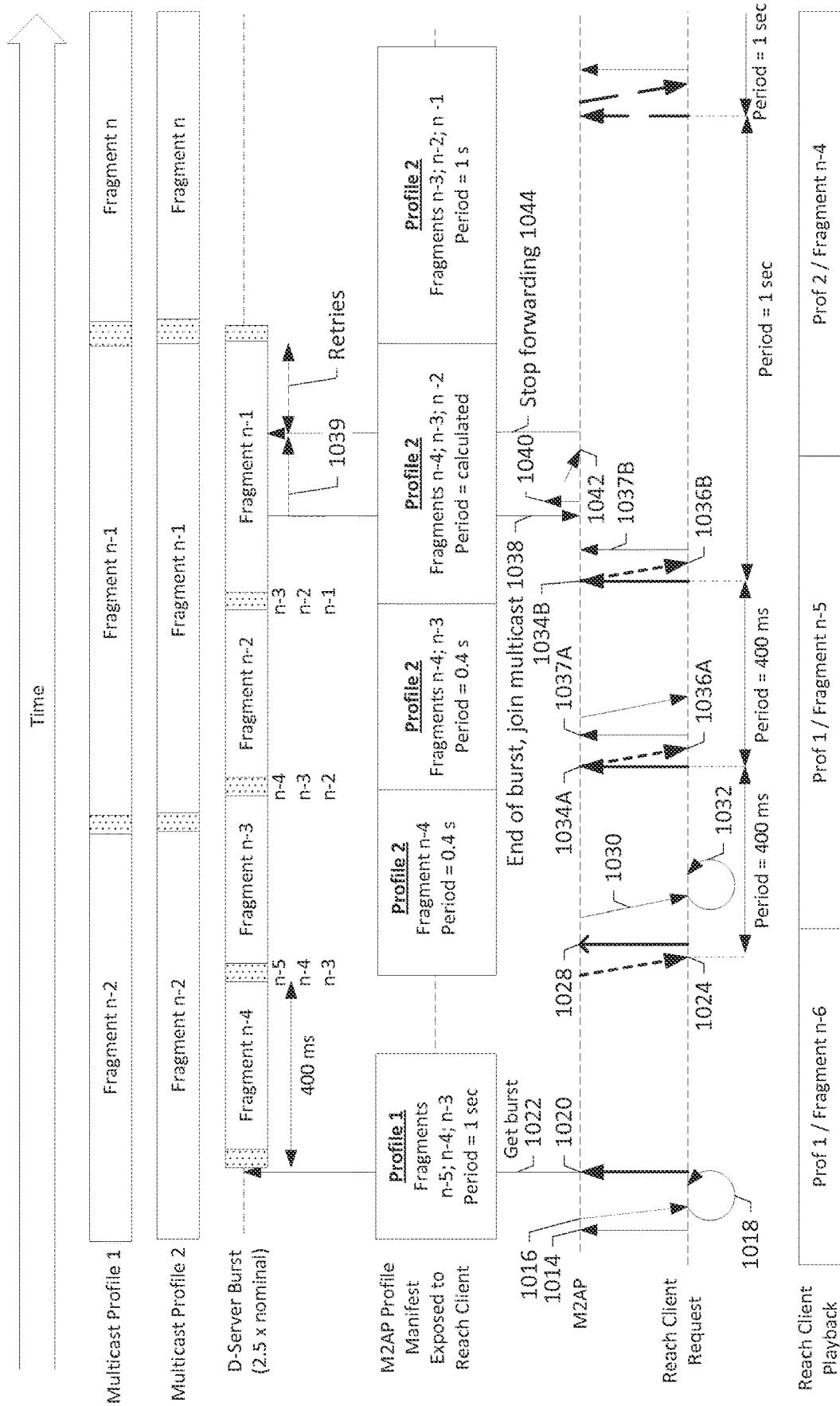
FIG. 11 depicts the timing of the process of FIG. 10.

Looking first at FIGS. 10 and 11, M2AP 805 joins a multicast corresponding to a specific profile (1010) and receives an RTP multicast stream containing an MPEG-2 transport stream (1012). It will be understood at this point that the accelerated tuning mechanism described earlier and depicted in FIGS. 8A and 9 is applied in these steps, but is not illustrated for clarity in understanding. As described in the earlier sections, the RTP multicast stream is composed of audio and video content, as well as an aggregate manifest. During a regular playback experience, reach device 803 requests fragments and new versions of the channel and profile manifests on a periodic basis, determined by analysis of the manifests (1014) and M2AP 805 returns the corresponding fragments or manifest updates to the reach device (1016). Upon reception of the fragment, the player on reach device 803 recalculates the heuristics (1018). In this example, reach device 803 evaluates the recalculated heuristics and requests the manifest for a different profile (1020). M2AP 805 immediately triggers a burst request (1022) from distribution server 809 in order to start filling its buffer with the latest fragments corresponding to the newly requested profile. As M2AP 805 has knowledge of the fragments previously requested by reach device 803 for the previous profile, M2AP 805 can request specific fragments to be delivered in priority by distribution server 809 for the new profile. One skilled in the art will recognize that while reach device 803 requests fragments from a new profile, the player on reach device 803 is still consuming audio and video packets previously received from M2AP 805. Distribution server 809 issues a data burst (1024) with the latest aggregate manifest and the RTP packets starting at the first fragment requested by M2AP 805. This data burst is the same as the data burst used in a channel tune request, with the exception that the current burst starts at the specific requested fragment rather than the beginning of the distribution server buffer. This burst could therefore last shorter than the burst issued as a result of a channel tune request.

As soon as M2AP 805 has re-assembled the first fragment sent by distribution server 809, M2AP 805 returns a profile manifest listing this fragment (1026), and sets the validity period of the manifest, as seen in FIG. 11, so that reach device 803 requests an update when the next fragment is available, e.g. 0.4 seconds. As also seen in FIG. 11, the profile manifest is updated by M2AP 805 every time a new fragment received from distribution server 809 is re-assembled. Reach device 803 starts requesting the fragment listed in the profile manifest (1028) and M2AP 805 returns the fragments to reach device 803 for playback (1030). Reach device 803 then updates its heuristics (1032). Reach device 803 keeps requesting new versions of the channel and profile manifests, and new fragments for this new profile (1034). As noted in the previous example and seen in FIG. 11, the period of the manifests is set to the maximum value, e.g. 1 second, which is equal to the fragment duration in the present disclosure, once M2AP 805 evaluates that distribution server 809 is close to ending the burst. M2AP 805 answers the request with the manifest and fragments stored in its cache (1036). Once the burst from distribution server 809 is complete, distribution server 809 instructs M2AP 805 to join the multicast stream (1038) and starts forwarding RTP packets at the rate E (1039). To ensure that the hole can be filled by the "E" burst at or near the same time as the first multicast fragment is downloaded, E will be equal to or greater than the IGMP join latency (j) divided by the fragment duration (f), as shown in the equation below. As usual, any additional missing RTP datagrams are retried through a specific request from M2AP 805 to distribution server 809, requesting the sequence needed to fill the hole.

$$\frac{IGMP \text{ join latency } (j)}{\text{Fragment duration } (f)}$$

M2AP 805 issues a multicast join (1040) and once the join is effectuated, M2AP 805 receives an RTP multicast stream for this profile (1042). This multicast contains an MPEG-2 transport stream with fragments and the aggregate manifest. The profile manifest previously exposed to the reach device is updated with a new validity period, computed based on the latest fragment index received. By computing this period accurately, the M2AP instructs the reach device when the next manifest is targeted to become available. Once the join occurs, M2AP 805 instructs distribution server 809 to stop sending packets (1044), although retries can still be requested as needed. The user gets visual confirmation that the video profile has changed only when the first fragment received from distribution server 809 gets displayed (1046). Depending on the client buffer fullness, this may take several seconds.

In FIGS. 12 and 13, M2AP 805 has detected some upstream constraints and determines to enforce specific policies towards reach device 803. These new policies should force reach device 803 to switch profiles in almost real-time. As this process begins, reach device 803 is tuned to a channel and consuming at a specific bitrate. M2AP 114 has therefore joined the corresponding multicast (1210) from multicast replication point 807. M2AP 805 receives RTP multicast packets, extracts fragments and profile manifests and caches them (1212). Reach device 803 requests fragments and manifest updates as usual (1214) and M2AP 805 returns the requested fragments and manifests (1216). It should be noted that although FIG. 13 shows a single profile being exposed to reach device 803 by M2AP 805, this is the profile that is being consumed; multiple profiles can be on offer, but are not specifically shown. At some point, M2AP 805 detects network contention. If the contention is not great enough to affect the current profile, M2AP 805 can simply limit the profiles that are made available to the reach device to those profiles that do not cause additional contention, i.e., a 5-profile configuration can be limited to a 3-profile configuration. If the contention is great enough, M2AP 805 decides that this class of device cannot consume the currently used profile and must be switched to a selected profile. Shortly before the fragment boundary, M2AP 805 performs an "IGMP leave" on the current multicast and an "IGMP join" to the selected multicast (1218/1219). The IGMP leave (1218) is sent (L) milliseconds before the fragment boundary where (L) is the average leave latency, while the IGMP join (1219) is sent at the fragment boundary. Until the "leave" is effective, M2AP 805 continues to receive multicast packets from the old profile to complete the old fragment. Once the join is effectuated, M2AP 805 starts receiving multicast packets corresponding to the new profile (1224). At the same time as the IGMP join (1219), M2AP 805 instructs (1220) distribution server 809 to send any remaining fragment data from the old profile followed by new fragment data from the new profile at E rate. Distribution server 809 sends (1221) the requested data to M2AP 805. To ensure the hole can be filled by the "E" burst at or near the same time as all the RTP datagrams corresponding to the first multicast fragment are downloaded, E will be equal to or greater than the IGMP join latency (j) minus the IGMP leave latency (l), the difference divided by the fragment duration (f). As previously noted, any additional missing RTP datagrams can be retried through a specific request from M2AP 805 to distribution server 809, requesting the sequence needed to fill the hole.

$$\frac{IGMP \text{ join latency } (j) - IGMP \text{ leave latency } (l)}{\text{Fragment duration } (f)}$$

Notably in this case, it is M2AP 805 that instructs distribution server 809 to forward fragments. In the previous situations, distribution server 809 will empty its buffer first, then instruct M2AP 805 to join the multicast stream, before starting the forwarding of fragments at E rate.

M2AP 805 also updates the channel manifest to restrict the number of profiles to two: the one for which it has cached fragments from the multicast stream, and the one to which it is forcing the client. It should be noted in the manifest exposed to the reach client in FIG. 13, that each profile has either (m) or (u) appended; these appended labels indicate the origin of the fragments retrieved for each profile, i.e., multicast or unicast and are provided only for help in understanding how the M2AP cache content is structured. If necessary, M2AP 805 can retrieve fragments over unicast if reach device 803 attempts to switch to this profile early. M2AP 805 starts receiving RTP packets (1224) sent from multicast replication point 807. Ideally, as soon as the first RTP multicast packet is received, M2AP 805 instructs distribution server 809 to stop forwarding the multicast packets (1226) and perform only retries. However, under certain conditions and timing, the burst may last longer until all sequence holes are filled. Reach device 803 requests the channel manifest as scheduled (1228), receives and parses the channel manifest (1230) and detects that only two profiles remain available (1232). Reach device 803 requests fragments based on the list provided in the profile manifest (1234). For a few fragment periods, depending on its internal buffer, reach device 803 will keep requesting fragments from the previous profile. However, as seen in FIG. 13, M2AP 805 is no longer buffering fragments from this multicast and as fragments expire, this profile manifest will list less and less fragments available. Additional requests from reach client 803 to M2AP 805 for channel manifests, profile manifests and fragments are illustrated in FIG. 13, but are not specifically labeled due to the difficulty of illustration. M2AP 805 replies to requests from reach device 803 with the fragments that are still available from the previous profile, or the ones requested for the second profile (1236). If the fragments are not cached yet, M2AP 805 can request those fragments from distribution server (809) using the mechanism previously described in the heuristics-based profile switch. Once all fragments from the first profile have expired, M2AP 805 updates its channel manifest to list only the second profile (1238). Reach device 803 requests the latest channel manifest, detects that only one profile is listed, and retrieves the corresponding profile manifest, then starts requesting fragments for this profile (1240). M2AP 805 returns the requested fragments to reach device 803 (1242). Because there is a change of profile, the User 801 will have visual confirmation that the reach device is now playing back a different stream (1244).

Figure 12A:
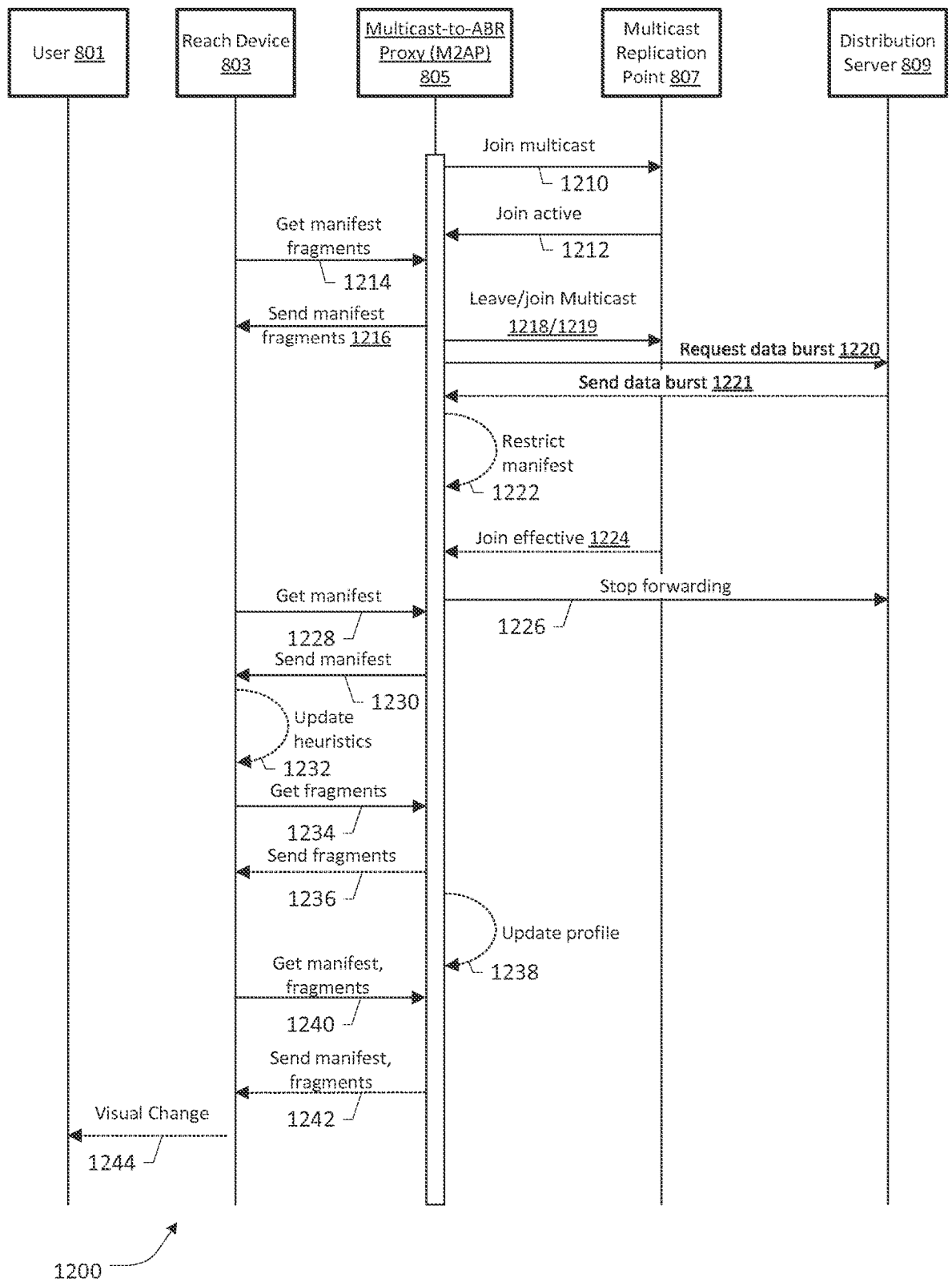
FIG. 12A depicts the process of forcing a reduction in the profile used by a reach device for policy enforcement according to an embodiment of the present patent application.
Figure 12B:
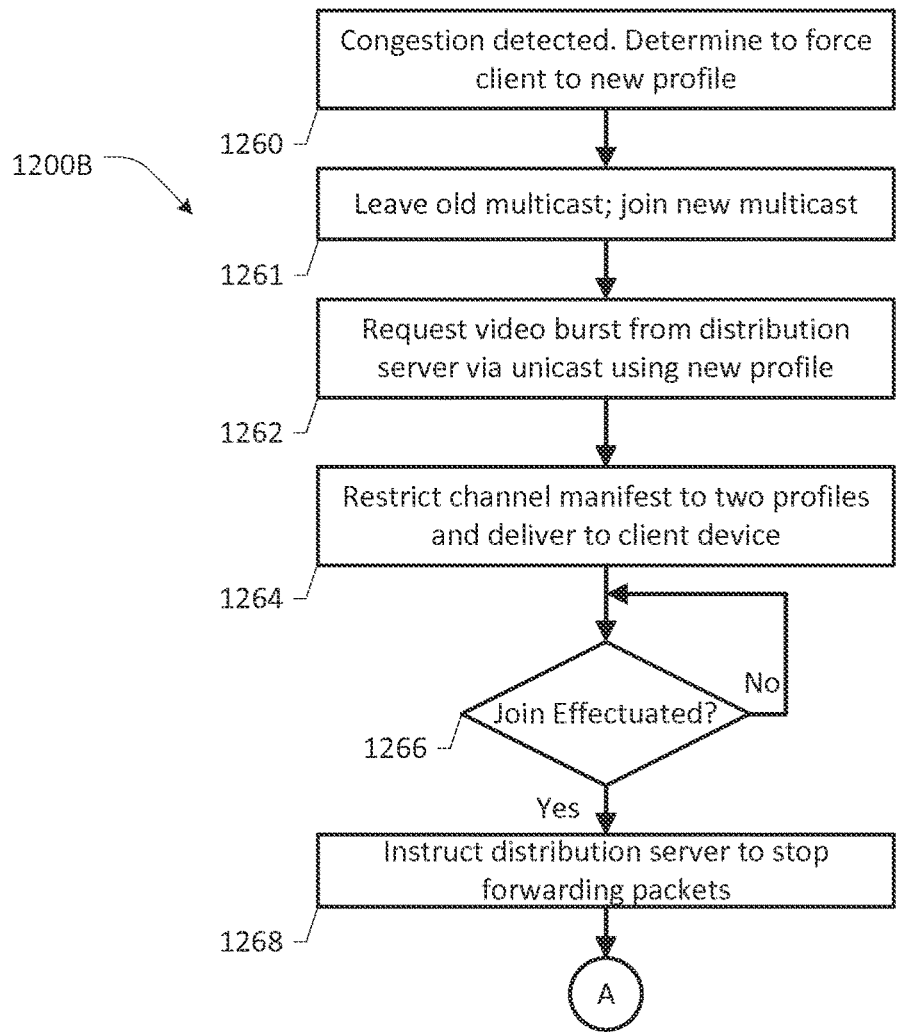
FIGS. 12B and 12C depict a simplified version of the process of FIG. 12A.
Figure 12C:
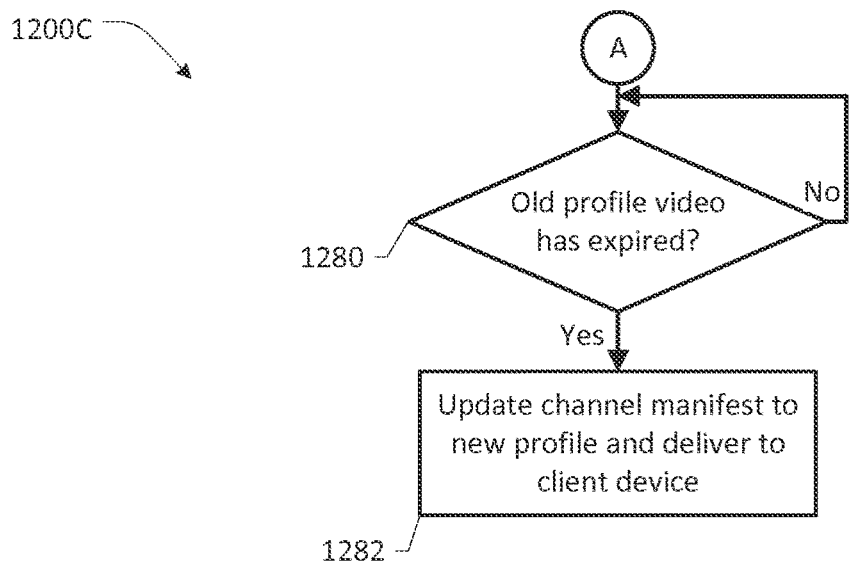
Figure 13:
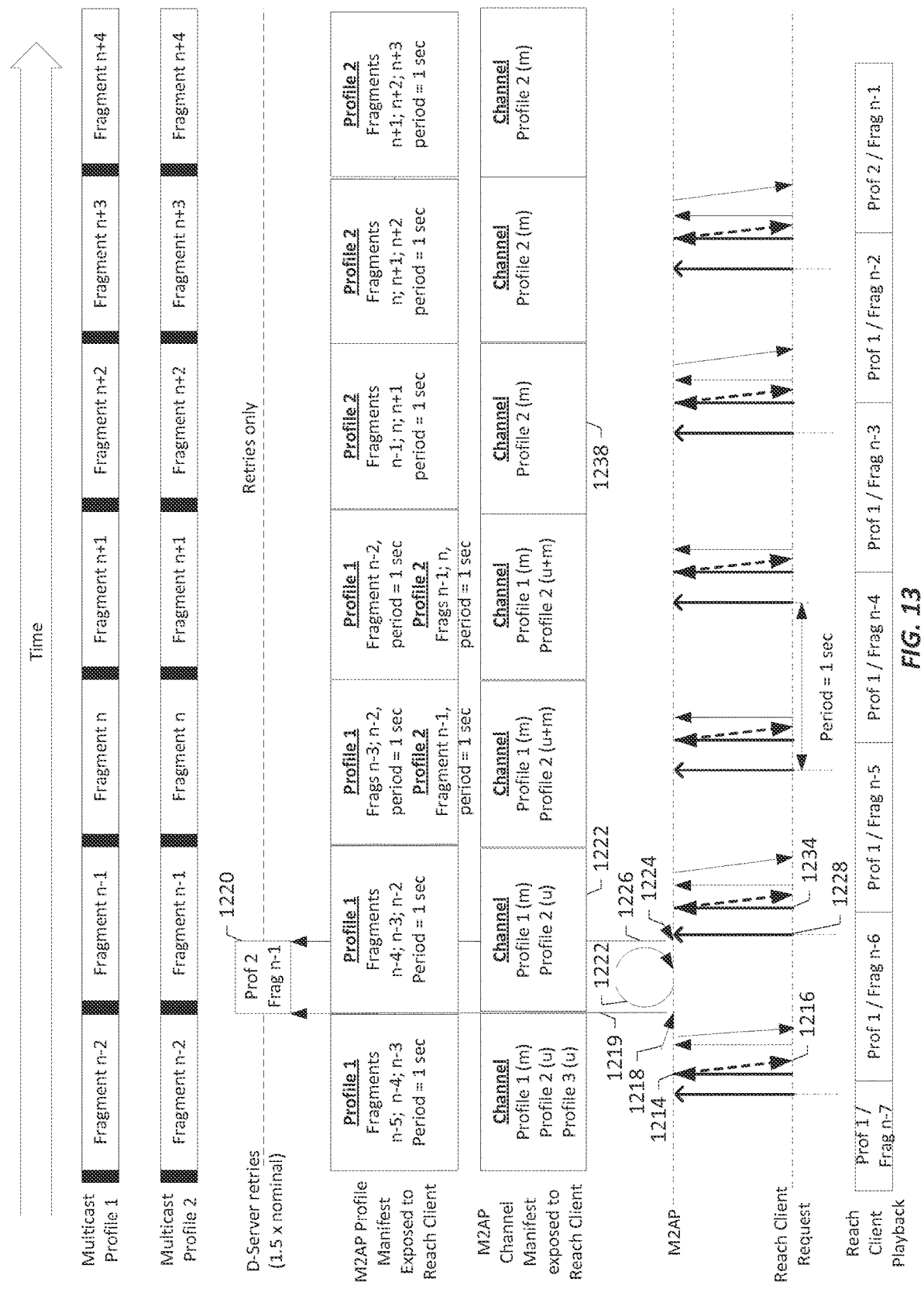
FIG. 13 depicts the timing of the process of FIG. 12A.

FIGS. 12B and 12C provide a simplification of the process of FIG. 12A in methods 1200B and 1200C. In method 1200B, M2AP 805 detects congestion and determines to force the client to a new profile (1260). M2AP 805 leaves the old multicast and joins a new multicast (1261); then requests a video burst from distribution server 809 via unicast, using the new profile (1262). M2AP 805 then restricts the channel manifest that will be provided to the client to two profiles—the currently used profile and the new profile—and delivers the restricted channel manifest to the client device (1264). M2AP 805 then determines whether the join has been effectuated (1266). If the join has been effectuated, M2AP 805 instructs distribution server 809 to stop forwarding packets (1268). The method then moves to method 1200C which determines whether the old profile video has expired (1270). When the old profile video has reached expiration, M2AP 805 further restricts the channel manifest to the new profile and continues delivering a restricted manifest to the client device (1282) for as long as necessary. During the time frame of methods 1200B and 1200C, M2AP 805 continues to provide video to the client via unicast, first delivering the previously requested video using the old profile, then changing when appropriate to the video at the new profile.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added or inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for providing live adaptive bitrate (ABR) video to a client device using a multicast-to-unicast-ABR proxy, comprising:
    responsive to the client device tuning to a channel or requesting a change in profile for the channel, the multicast-to-unicast-ABR proxy requesting from a distribution server a burst of video fragments for the channel using a selected profile, the burst of video fragments to be delivered via unicast;
    the multicast-to-unicast-ABR proxy receiving the burst of video fragments and an aggregate manifest from the distribution server at a first rate that is a configurable percentage of a bitrate for receiving real-time multicast, wherein the multicast-to-unicast-ABR proxy sets a period of the aggregate manifest to a value according to when it is anticipated to have a new fragment re-assembled from the burst of video fragments and repeats generation of new profile manifests with fragments listed in each profile manifest until all fragments listed in the aggregate manifest are available, wherein the aggregate manifest includes information for two or more profiles available via multicast;
    the multicast-to-unicast-ABR proxy providing video for the channel from the burst of video fragments to the client device via unicast using the selected profile;
    responsive to the burst of video fragments being completed, the multicast-to-unicast-ABR proxy requesting to join a multicast for the channel, the multicast using the selected profile; and
    the multicast-to-unicast-ABR proxy providing video for the channel from the multicast video fragments to the client device via unicast using the selected profile.

2. The method as recited in claim 1 further comprising the multicast-to-unicast-ABR proxy checking for discontinuities in a sequence of RTP packets and requesting any missing RTP packets from the distribution server.

3. The method as recited in claim 2 further comprising after completion of the burst of video fragments, receiving additional unicast video fragments from the distribution server buffer at a second rate that is lower than the rate for multicast.

4. The method as recited in claim 3 further comprising responsive to the multicast join being effectuated, instructing the distribution server to stop sending video fragments via unicast burst.

5. The method as recited in claim 4 wherein responsive to the client device requesting a change in profile, starting the burst of video fragments at a starting point indicated in the request for the profile change.

6. The method as recited in claim 1, wherein the client device is operating at a premises in a managed network, and wherein the multicast-to-ABR proxy is at the premises.

7. The method of claim 1 further comprising:
providing a first manifest to the client device via unicast using the selected profile, wherein providing the first manifest includes setting the first manifest to have a first validity period; and
providing a second manifest, that is based on the aggregate manifest, to the client device via unicast using the selected profile, wherein providing the second manifest includes setting the second manifest to have a second validity period, wherein the second validity period is larger than the first validity period.

8. A multicast-to-unicast adaptive bitrate (ABR) proxy (M2AP) for providing live ABR video to a client device, comprising:
an ABR manager that is configured, responsive to a client device tuning to a channel or requesting a change in profile for the channel, to request from a distribution server a first burst of video fragments for the channel using a first profile, the first burst of video fragments to be delivered via unicast;
a multicast receiver that is configured:
to receive the first burst of video fragments and an aggregate manifest from the distribution server, the first burst of video fragments received at a first rate that is a configurable percentage of a bitrate for receiving real-time multicast, wherein the multicast-to-unicast-ABR proxy sets a period of the aggregate manifest to a value according to when it is anticipated to have a new fragment re-assembled from the burst of video fragments and repeat generation of new profile manifest with fragments listed in each profile manifest until all fragments listed in the aggregate manifest are available, wherein the aggregate manifest includes information for two or more profiles available via multicast;
responsive to the first burst of video fragments being completed, to request to join a first multicast for the channel, the first multicast using the first profile; and
an output interface that is configured, responsive to receiving the first burst of video fragments, to provide video for the channel from the burst of video fragments to the client device via unicast using the first profile and further configured, responsive to receiving the multicast video fragments, to provide video for the channel from the multicast video fragments to the client device via unicast using the first profile.

9. The M2AP as recited in claim 8 further comprising RTP packet validation that is configured to check for discontinuities in a sequence of RTP packets and to request any missing RTP packets from the distribution server.

10. The M2AP as recited in claim 9 wherein the ABR manager is configured, after completion of the first burst of video fragments, to receive additional unicast video fragments at a second rate that is lower than the rate for real-time multicast.

11. The M2AP as recited in claim 10 wherein the ABR manager is configured, responsive to the first multicast join being effectuated, to instruct the distribution server to stop sending video fragments via unicast burst.

12. The M2AP as recited in claim 11 wherein the ABR manager is configured, responsive to the client device requesting a change in profile, to indicate a starting point for the first burst of video fragments in the request for the first burst of video fragments.

13. The M2AP as recited in claim 8, wherein the client device is operating at a premises in a managed network, and wherein the M2AP is at the premises.

14. The M2AP as recited in claim 8 wherein the ABR manager is further configured:
to provide a first manifest to the client device via unicast using the selected profile, wherein providing the first manifest includes setting the first manifest to have a first validity period; and
to provide a second manifest, that is based on the aggregate manifest, to the client device via unicast using the selected profile, wherein providing the second manifest includes setting the second manifest to have a second validity period, wherein the second validity period is larger than the first validity period.

* * * * *